United States Patent [19]

Shaw

[11] 4,196,595
[45] Apr. 8, 1980

[54] INTEGRATED THERMAL SOLAR HEAT PUMP SYSTEM

[75] Inventor: David N. Shaw, Unionville, Conn.

[73] Assignee: Dunham-Bush, Inc., West Hartford, Conn.

[21] Appl. No.: 924,015

[22] Filed: Jul. 11, 1978

Related U.S. Application Data

[63] Continuation-in-part of Ser. No. 882,729, Mar. 2, 1978, which is a continuation-in-part of Ser. No. 806,407, Jun. 14, 1977, Pat. No. 4,148,436, which is a continuation-in-part of Ser. No. 782,675, Mar. 30, 1977, Pat. No. 4,086,072, which is a continuation-in-part of Ser. No. 653,568, Jan. 29, 1976, Pat. No. 4,058,988.

[51] Int. Cl.² .................. F25B 13/00; F25B 27/02
[52] U.S. Cl. ........................... 62/160; 62/324; 62/503; 237/2 B
[58] Field of Search ............ 62/510, 324, 238, 160, 62/503; 237/2 B

[56] References Cited

U.S. PATENT DOCUMENTS

| | | | |
|---|---|---|---|
| 3,432,089 | 3/1969 | Schibbye | 418/201 X |
| 3,664,150 | 5/1972 | Patterson | 62/503 X |
| 3,936,239 | 2/1976 | Shaw | 417/315 |
| 4,030,315 | 6/1977 | Harnish | 62/503 X |

Primary Examiner—William E. Wayner
Attorney, Agent, or Firm—Sughrue, Rothwell, Mion, Zinn and Macpeak

[57] ABSTRACT

A compression module may comprise a hermetic helical screw rotary compressor having injection and ejection ports in addition to discharge and suction ports or may comprise a multiple cylinder, multiple level, reciprocating compressor. The module incorporates a subcooler coil and is connected to an outside air coil, a thermal energy storage coil, a direct solar energy supply coil, one or more inside coils for the space to be conditioned and a hot water coil through common, discharge manifold, suction manifold, liquid drain manifold and liquid feed manifold, by suitable solenoid operated control valves and check valves. The solenoid operated control valves are selectively operated in response to system operating parameters. Seal pots and positive displacement pumps may operate to force liquid refrigerant condensed at intermediate pressure to flow to the receiver which is pressurized at a pressure corresponding to the condensation temperature of the highest pressure condensing coil in the system. Alternatively, liquid refrigerant expansion may be used to reach a common receiver pressure for all condenser returns.

15 Claims, 13 Drawing Figures

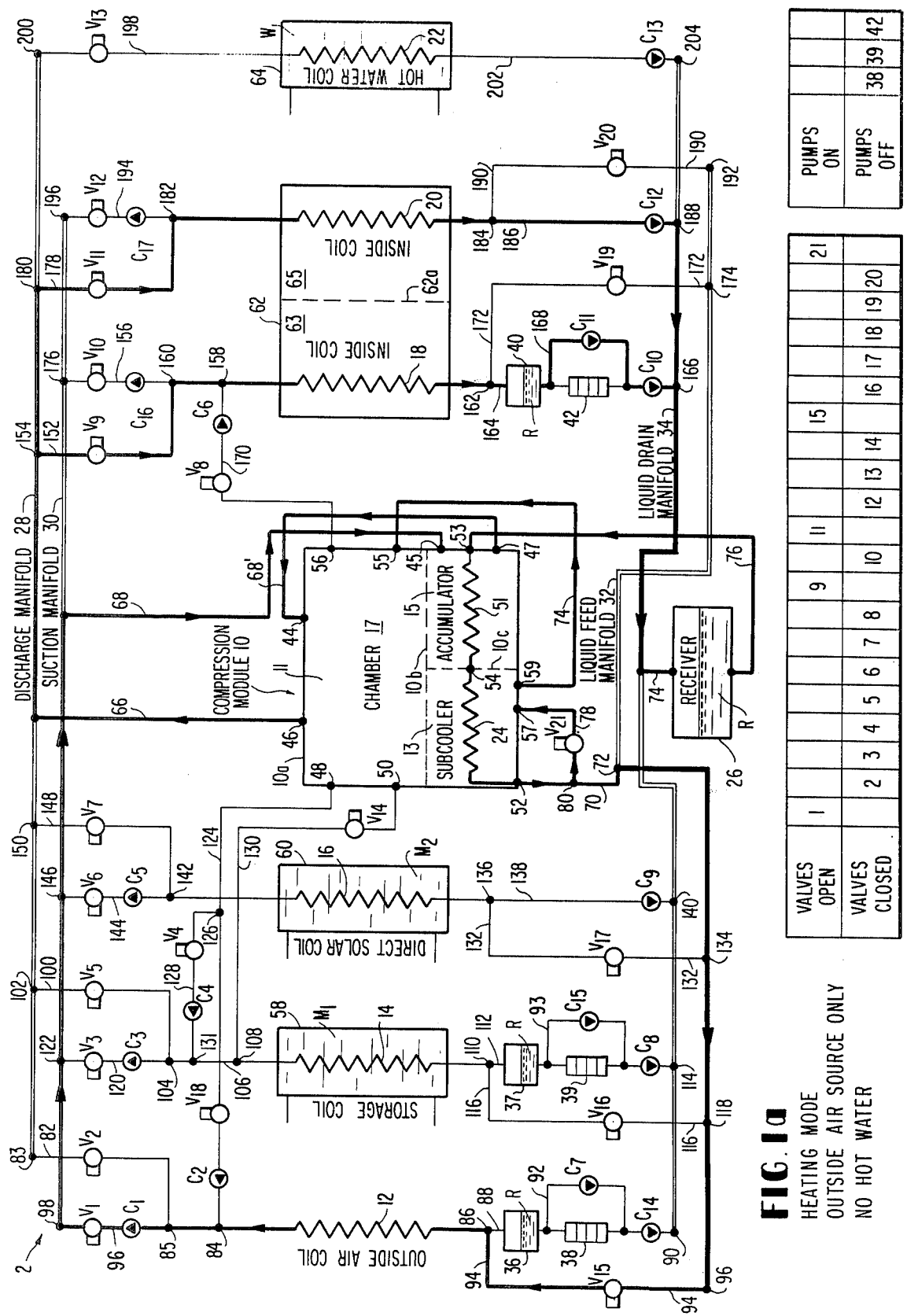

HEATING MODE
STORAGE AND DIRECT SOLAR COIL
SUPPLY WITH HOT WATER HEATING

HEATING MODE
OUTSIDE AIR TO STORAGE

HEATING MODE
DIRECT SOLAR COIL
TO HOT WATER

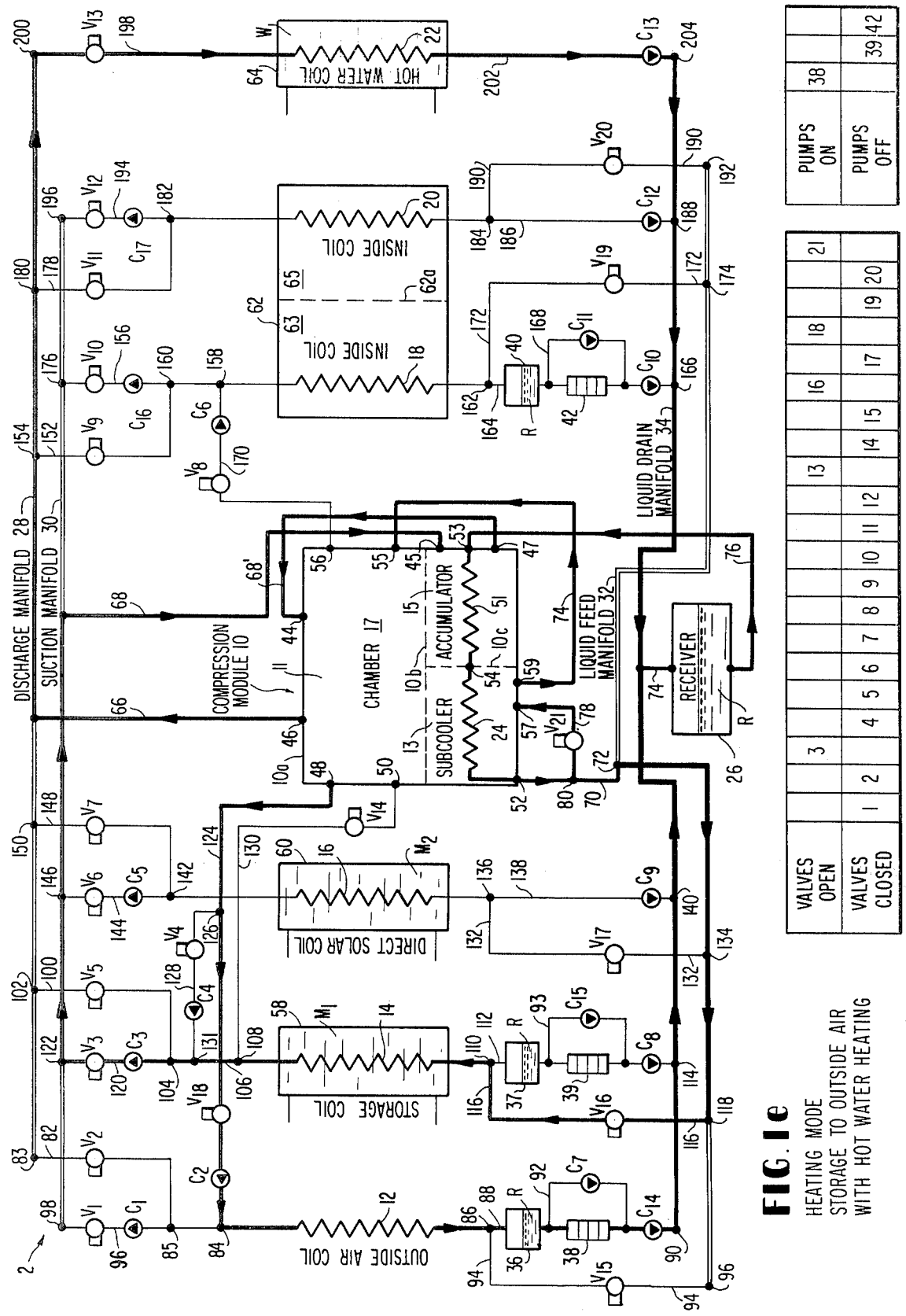
FIG. 1e HEATING MODE STORAGE TO OUTSIDE AIR WITH HOT WATER HEATING

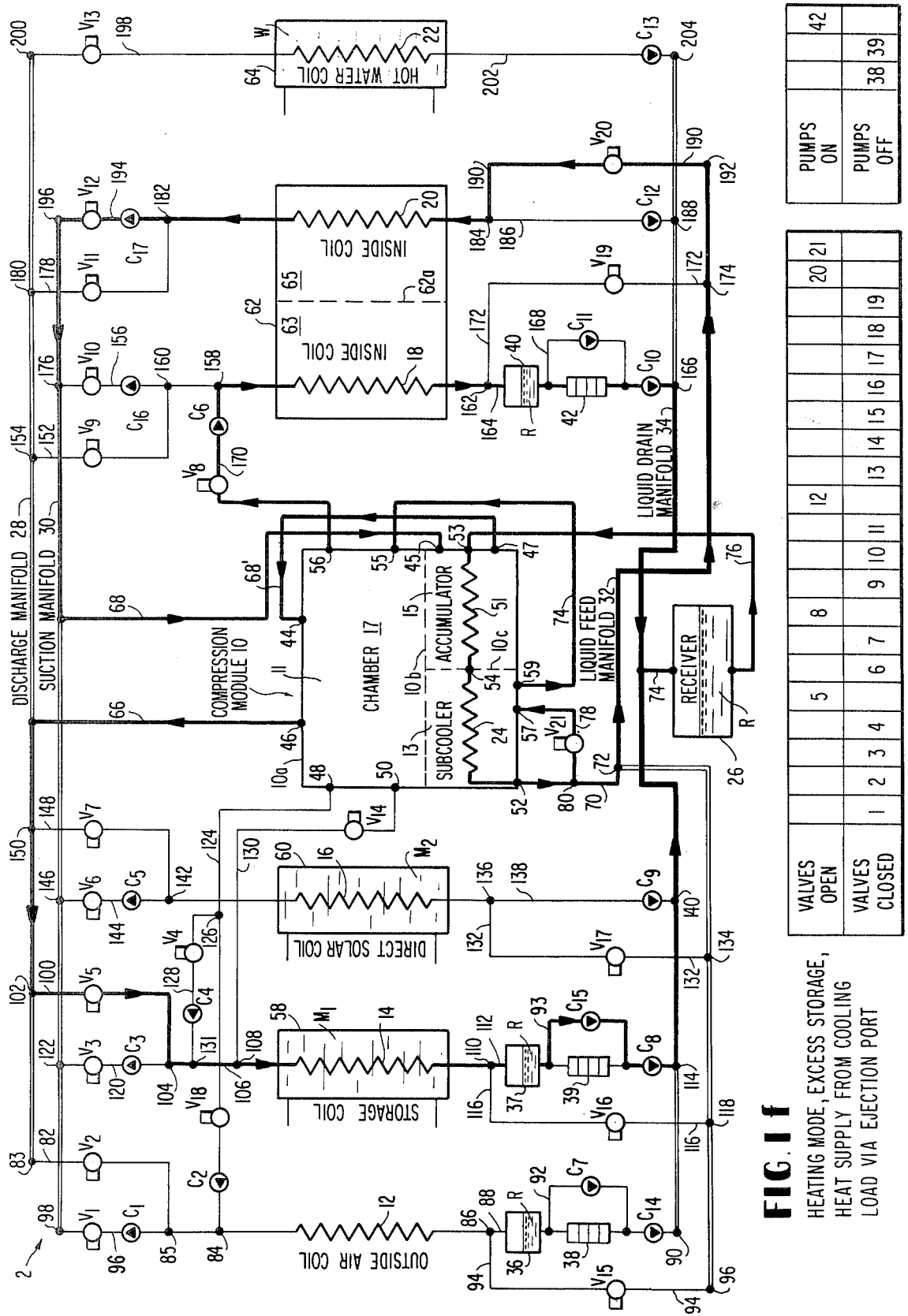
FIG. 1f  HEATING MODE, EXCESS STORAGE, HEAT SUPPLY FROM COOLING LOAD VIA EJECTION PORT

COOLING MODE
REJECT TO OUTSIDE AIR
WITH HOT WATER HEATING

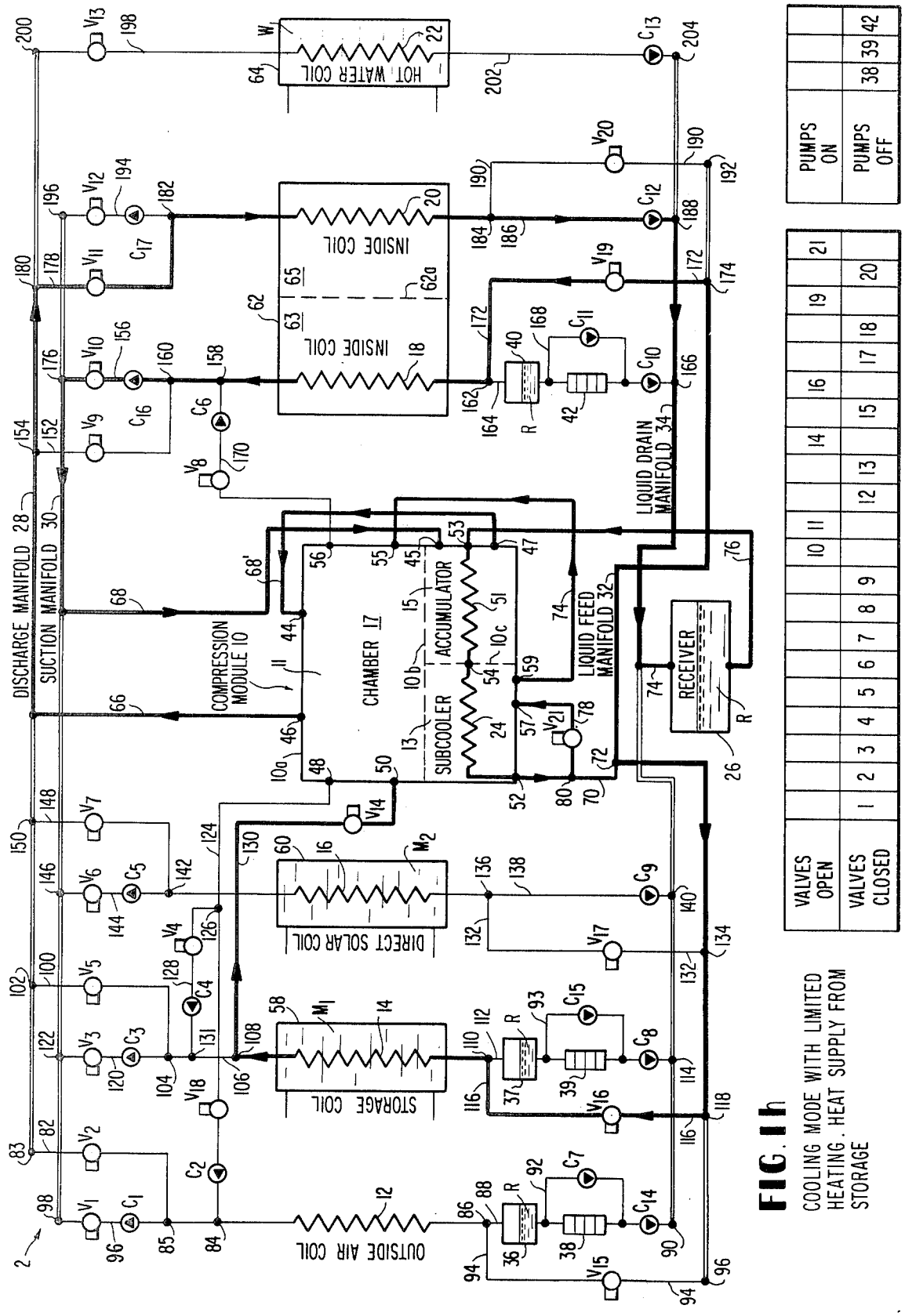
FIG. 1h COOLING MODE WITH LIMITED HEATING. HEAT SUPPLY FROM STORAGE

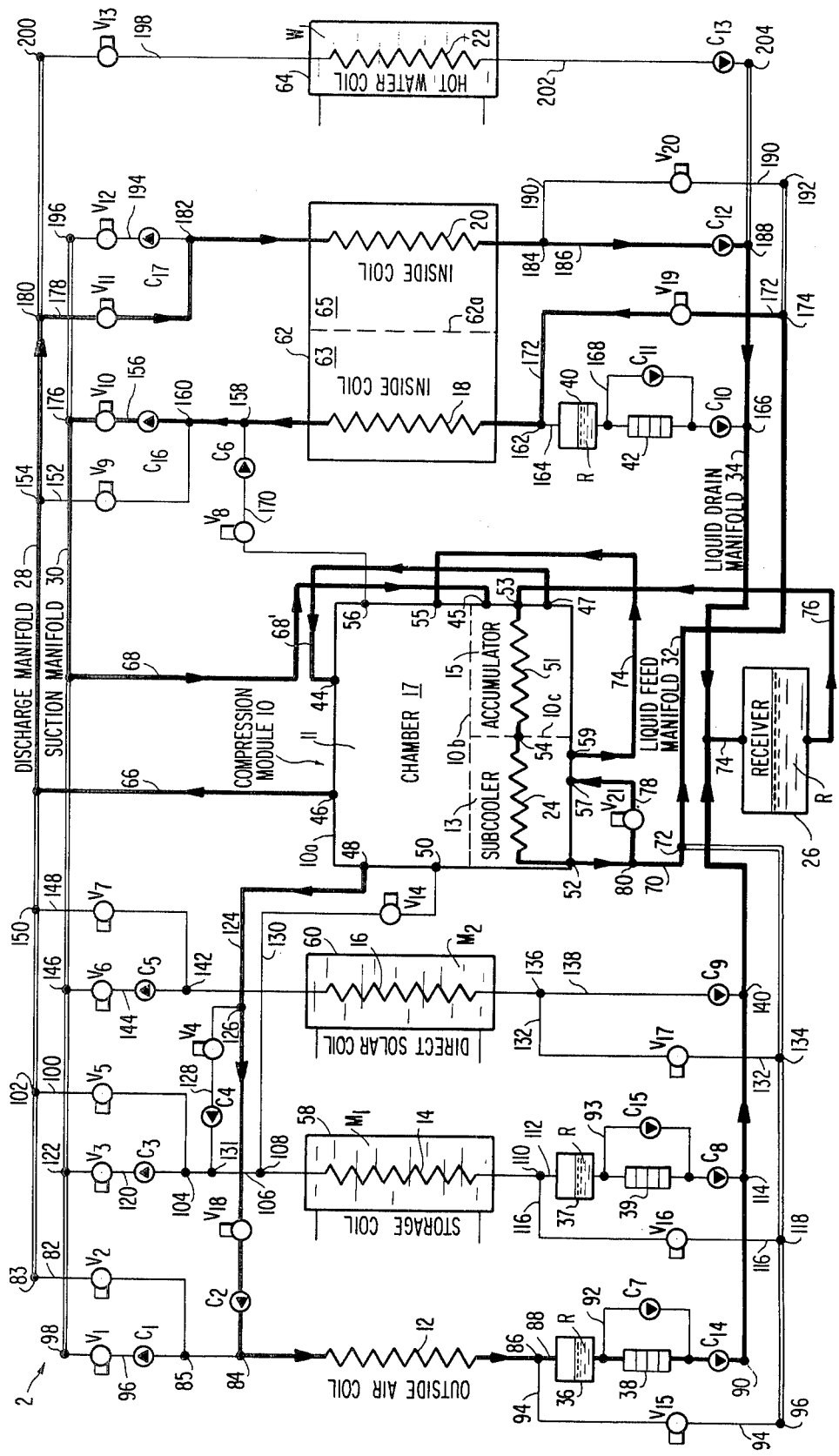
FIG. 1i COOLING MODE WITH LIMITED HEATING, EXCESS HEAT REJECT TO OUTSIDE AIR

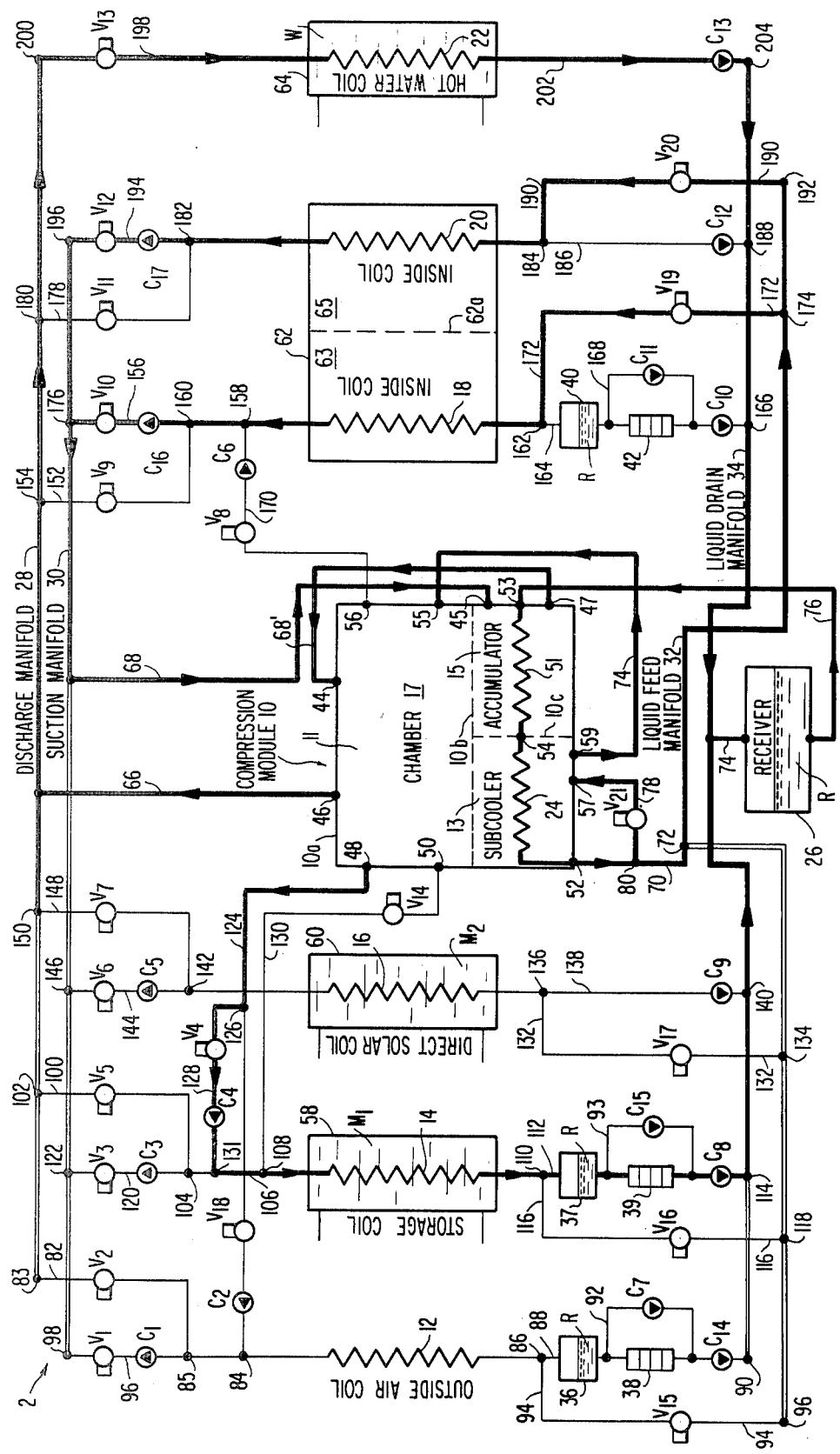
FIG. 1j COOLING MODE WITH HOT WATER HEATING. EXCESS HEAT TO STORAGE.

FIG.2

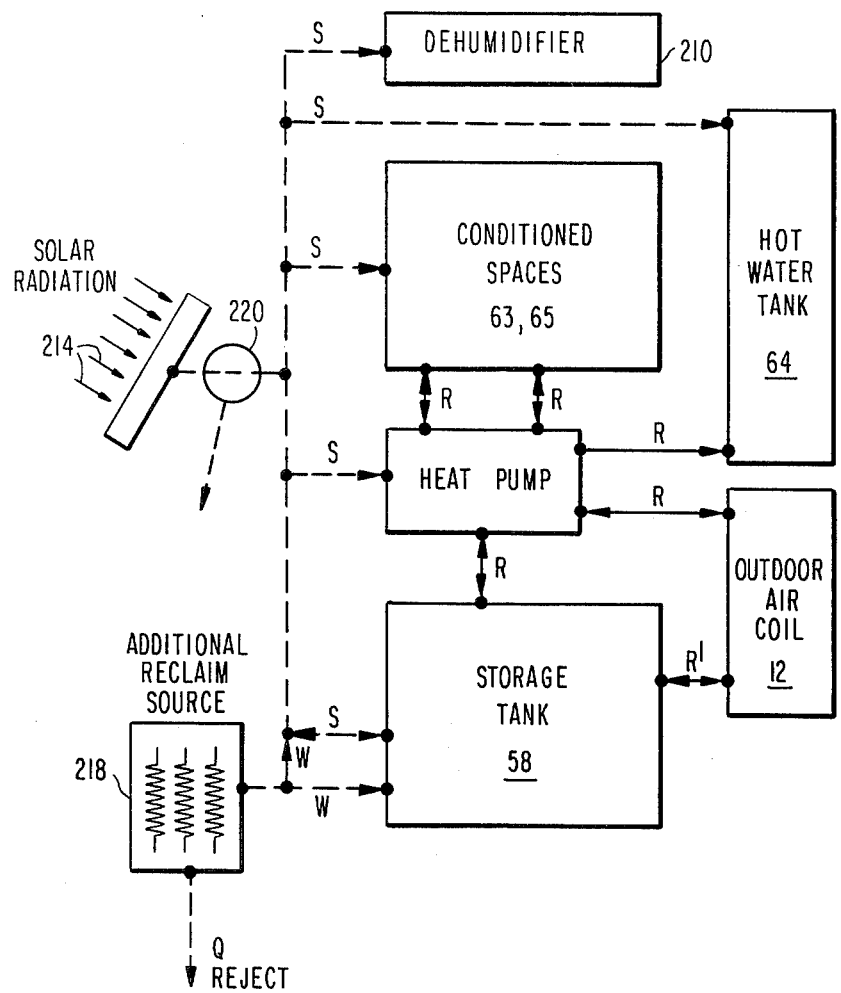

NOTES:

DIRECTION OF ARROW = PERMISSIBLE ENERGY FLOW DIRECTION

R = REFRIGERANT

S = COLLECTOR FLUID – HIGH TEMP. OIL, SILICONE, etc.

W = WATER

R' = INDICATES LIQUID REF. PUMP OPERATION. I.E., FREE NOCTURNAL OR OTHER TIME DISSIPATION WHEN TANK F°>AIR F° AND COMPUTER ALSO SELECTS DISSIPATION.

2, R-CONN. TO CONDITIONED SPACES ALLOWS SIMULTANEOUS HEATING AND COOLING MODE OR BOTH COILS SOLELY ON HEATING OR COOLING MODE ALONE.

INTEGRATED THERMAL SOLAR HEAT PUMP SYSTEM

This application is a continuation-in-part application of application Ser. No. 882,729 filed Mar. 2, 1978, entitled "TRI-LEVEL MULTI-CYLINDER RECIPROCATING COMPRESSOR HEAT PUMP SYSTEM", which application is a continuation-in-part application of application Ser. No. 806,407 filed June 14, 1977, now U.S. Pat. No. 4,148,436 entitled "SOLAR AUGMENTED HEAT PUMP SYSTEM WITH AUTOMATIC STAGING RECIPROCATING COMPRESSORS", which application is a continuation-in-part application of application Ser. No. 782,675 filed Mar. 30, 1977, entitled "AIR SOURCE HEAT PUMP WITH MULTIPLE SLIDE ROTARY SCREW COMPRESSOR/EXPANDER", now U.S. Pat. No. 4,086,072 issuing Apr. 25, 1978, which in turn is a continuation-in-part application of application Ser. No. 653,568 filed Jan. 29, 1976, entitled "HEAT PUMP SYSTEM WITH HIGH EFFICIENCY REVERSIBLE HELICAL SCREW ROTARY COMPRESSOR", now U.S. Pat. No. 4,058,988 issuing Nov. 22, 1977, all assigned to the common assignee.

BACKGROUND OF THE INVENTION

Refrigeration systems, particularly heat pump systems selectively heat or cool a space to be conditioned and employ positive displacement refrigerant compression equipment for picking up heat through a closed refrigeration loop external of the space to be conditioned and supplying heat thereto through one coil acting as a system evaporator and releasing that heat to the space being conditioned by a second coil functioning as a condenser within that space, or alternatively, by reversal of refrigerant flow causing heat to be absorbed within the space to be conditioned by employing the coil therein as the system evaporator and discharging the heat external of the space by way of the second coil within the closed loop functioning in that case as the system condenser. Thermal energy may be supplied to the system by means of a third coil from a heat storage media surrounding that coil, which in turn is heated by solar radiation, etc. Further, systems of this type have employed as the usual source of thermal energy an outside coil either within the air external of the space or building being conditioned or within the ground and being connected circuitwise, within the loop and in parallel with the storage coil. The systems include control means for either alternatively or simultaneously connecting both the storage coil and the outside air coil within the closed loop to the compressor and the coil or coils within the space being conditioned, so as to supply when in system heating mode, thermal energy to the space to be conditioned by these sources.

Because of the necessity to reverse refrigerant flow, particularly with respect to the inside coil within the space being conditioned, and the outside coil, either the positive displacement compressor is driven reversely, particularly in the case where the compressor constitutes a helical screw rotary compressor, or reversing valves are employed to switch connections between the discharge and suction sides of the compressor and the respective coils. Such systems have been complicated both in terms of the valving and conduits or lines for connecting the system componentry, and the complexity is magnified where the reversible refrigeration system includes in addition to the outside air coil, storage coil and inside coil, additional coils such as a direct solar energy supply coil, a hot water coil for providing a relatively high temperature water to the building or space to be conditioned, and an additional inside hydronic coil for supplemental heating or cooling of that space or, independently, a section thereof.

Further, the systems tend to be custom designed in that each system is designed independently, depending upon its particular need.

It is, therefore, a primary object of the present invention to provide an improved refrigeration system, particularly of the heat pump type which is of modular form and which completely eliminates the need for a reversing valve and its attendant controls.

It is a further object of the present invention to provide an improved modular refrigeration system which employs a compression module consisting of a multiple cylinder, multiple level reciprocating compressor or a helical screw rotary compressor with porting permitted intermediate pressure return to the compressor and supply therefrom in addition to low pressure suction return and high pressure discharge with the compression modules being interchangeable relative to the remaining componentry of the system.

SUMMARY OF THE INVENTION

This invention relates to a refrigeration system of the type for conditioning of building space or the like and including a first, inside heat exchange coil within the building space and a second, outside heat exchange coil exterior of that space, with the coils trading functions as evaporator and condenser to absorb heat and discharge heat, respectively, with respect to such space. The system includes a compressor and conduit means carrying refrigerant and defining a closed refrigeration loop including the coils and the compressor. A subcooler is located within the circuit and includes a subcooling heat exchange coil for subcooling condensed refrigerant from the coil functioning as a condenser and further includes a third heat exchange coil functioning to supply heat to the circuit or to store heat derived therefrom and a fourth heat exchange coil functioning as a system high temperature condenser for supplying a high temperature heating load. The improvement resides in the compressor and subcooler comprising a single housing module including, at least, separate compressor and subcooler sections, with the compressor section comprising at least one intermediate pressure injection ports and at least one intermediate pressure ejection port, and the subcooler section comprising liquid refrigerant subcooler coil inlet and exit ports, a subcooler bleed line supply port and a subcooler vapor return port. Further, a subcooler heat exchange coil is provided within the subcooler section and connected at respective ends thereof to the subcooler inlet and exit ports, and a liquid refrigerant bleed line connects the liquid refrigerant subcooler inlet port to the conduit means downstream of the subcooler outlet port, and further means for connecting the subcooler vapor return port to one of at least one intermediate injection ports of compressor section.

The invention is further highlighted by the conduit means including a discharge manifold, a liquid drain manifold, a liquid feed manifold and a suction manifold, with the subcooler coil inlet port connected to the liquid drain manifold and the subcooler coil outlet port connected to the liquid feed manifold. The first, second, third and fourth heat exchange coils are connected across the discharge and liquid drain manifolds for permitting those coils to function as condensers within the system and the first coil, second coil and third coil are also connected across the liquid feed and suction manifolds for permitting said first, second and third coils to function as evaporators within the system. Valve means within the conduit means selectively control refrigerant flow to and from the coils and selectively operated pump means positioned within the conduit means between the first, second and third coils respectively and the liquid drain manifold act, when energized, to force liquid refrigerant from the coils acting as low pressure condensers to flow towards the liquid feed manifold along with condensed refrigerant from any one of the first, second, third and fourth coils functioning as the high temperature condenser for the system.

Preferably, the module further comprises a separate accumulator section with an accumulator coil positioned within the accumulator section and connected between the subcooler coil inlet and the liquid drain manifold, and the accumulator section being connected by conduit means between the suction manifold and the compressor suction port such that hot liquid refrigerant within the accumulator coil is subcooled while effecting vaporization of any liquid refrigerant accumulating within the accumulator section prior to the refrigerant in vapor form feeding to the compressor through the compressor suction port. Further, preferably, a receiver is connected in series with the accumulator coil and the subcooler coil and between the liquid drain manifold and the inlet to the accumulator coil.

A fifth heat exchange coil functioning to supply heat to the circuit or store heat derived therefrom is connected across the liquid discharge and drain manifolds and the liquid feed and suction manifolds, permitting this coil to function either as an evaporator or a condenser with the outlet side of the third and fifth heat exchange coils being connected to an intermediate pressure injection port of the module compressor section, with valve means therein for controlling flow of refrigerant from the outlet of one of the third and fifth heat exchange coils to the compressor section injection port when any such coil functions as an intermediate pressure evaporator and supplies heat to the system.

A sixth heat exchange coil may be provided within the building space and separated thermally from the first coil and functioning to supply heat or remove heat from a separate portion of the building space, with this coil connected across the discharge and liquid drain manifolds for permitting that coil to function as a condenser and also across the liquid feed and suction manifolds for permitting the coil to function as an evaporator, with the inlet side of the first coil being connected to a compressor section ejection port and with valve means within the conduit means for selectively controlling refrigerant flow from the compressor section ejection port to the first coil to cause the first heat exchange coil to function as a condenser to effect heating of the building space under conditions in which limited heating of the space is required. The conduit means further preferably comprises means for connecting the ejection port of the compressor section to the second and third heat exchange coils and in parallel with the conduit means connecting the discharge manifold to those coils and including selectively operable valve means for controlling refrigerant flow from the compressor section ejection port to the second and third heat exchange coils under conditions in which the second or third heat exchange coils perform a limited condensing function to reject heat from or to store excessive heat of the refrigeration system, respectively.

An alternative liquid side of the system can be achieved whereby the receiver pressure is determined by the lowest condensing pressure in the system and the high pressure condensers in the system feed their condensed liquid to the receiver via a high side float device located within the seal pots, i.e., high pressure condensed liquid would accumulate in a seal pot until the float lifted to the point where high pressure liquid was expanded across the float orifice and resulting intermediate pressure liquid and gas sent on to the receiver. This arrangement is practical for those systems where the lowest condensing pressure desired and the highest evaporating pressure desired were always adequately provided.

BRIEF DESCRIPTION OF THE DRAWINGS

FIG. 1a is a schematic diagram of the heat pump system of FIG. 1 under heating mode with the outside air coil only as the heat source.

FIG. 1e is a schematic diagram of the heat pump system of FIG. 1 under cooling mode with hot water heating only.

FIG. 1f is a schematic diagram of the heat pump system of FIG. 1 under heating mode with heat supplied from space cooling load.

FIG. 1h is a schematic diagram of the heat pump system of FIG. 1, under cooling mode with limited heating and heat supplied from storage.

FIG. 1i is a schematic diagram of the heat pump system of FIG. 1 under cooling mode with limited heating and with excess heat rejected to the outside air.

FIG. 1j is a schematic diagram of the heat pump system of FIG. 1 under cooling mode with hot water heating and excess heat to storage.

FIG. 2 is a block energy flow diagram of an integrated thermal solar system incorporating the heat pump system of FIG. 1.

DESCRIPTION OF THE PREFERRED EMBODIMENTS

Figure 1:
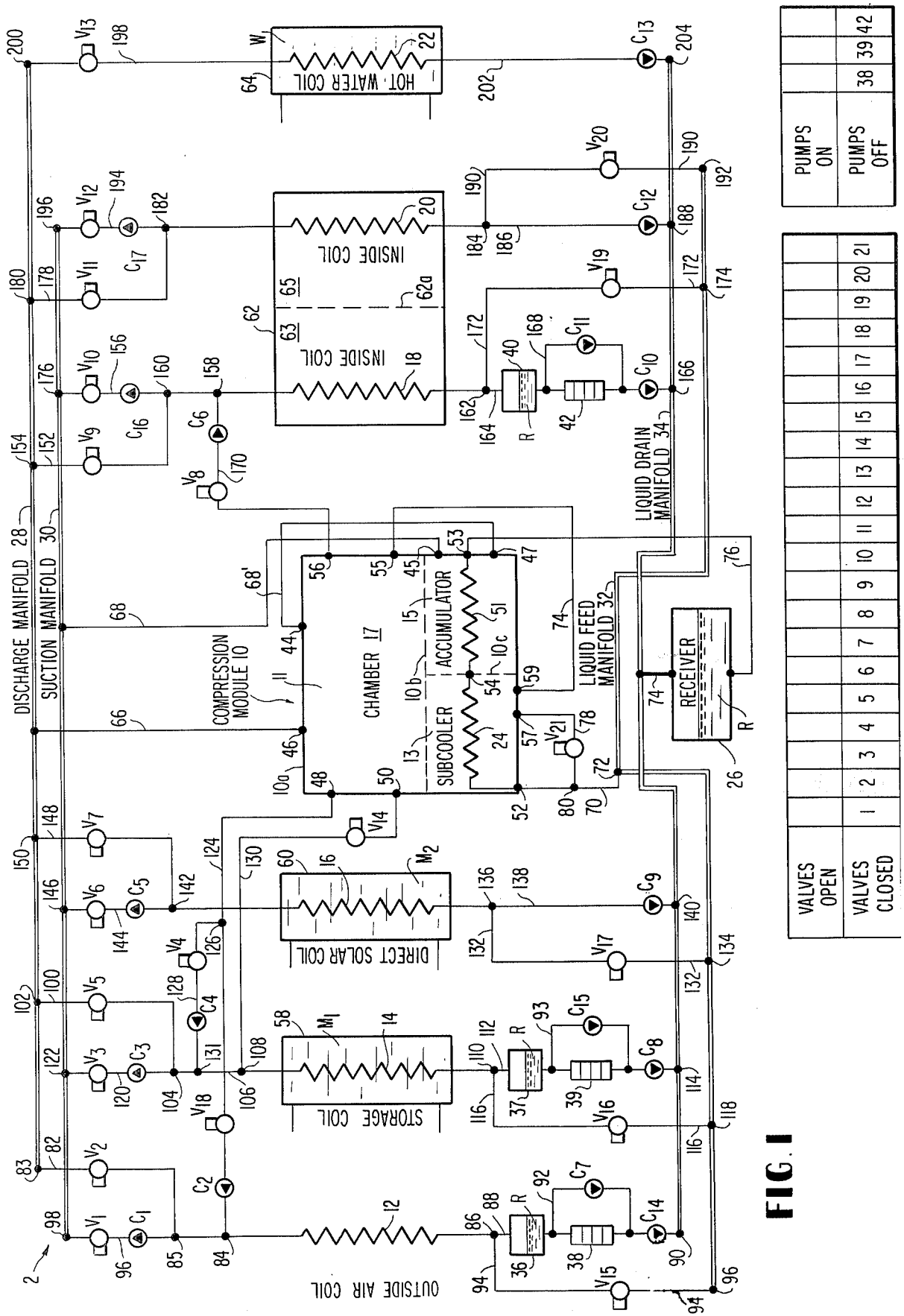
FIG. 1 is a hydraulic schematic diagram of the improved modular heat pump refrigeration circuit of the present invention, as a heat pump system embodiment.

Referring first to FIG. 1, there is shown in schematic form, one embodiment of the improved modular refrigeration system of the present invention in the form of a heat pump system indicated generally at 2 and employed primarily in controlling the temperature of spaces 63 and 65 of a building 62 to be conditioned, which building 62 is sectioned by partition 62a into the two spaces 63 and 65, each bearing refrigerant coils.

In that respect, the system of the present invention comprises as primary components a compression module indicated generally at 10, an outside air coil 12, a thermal energy or heat storage coil indicated generally at 14, a direct solar coil 16, an inside coil 18 (within space 63 to be conditioned), an inside oil coil 20 for space 65 of the building 62, a hot water coil 22, a subcooler coil 24 (forming an element of a subcooler 13 of compression module 10), an accumulator coil 51 (within accumulator 15 which forms an element of compression module 10), and a receiver 26. The inside coil 18 may constitute an inside air coil and the inside coil 20 may constitute an inside hydronic coil, that is, the coil 20 may be immersed in a liquid media which is circulated through space 65 to be conditioned and providing thermal energy to the perimeter of the building, for instance, or removing heat therefrom.

An important aspect of the present invention, in addition to the utilization of a compression module 10 and its compressor 11, subcooler 13 and accumulator 15, is the employment of four basic fluid manifolds; a discharge manifold 28, a suction manifold 30, a liquid feed manifold 32, and a liquid drain manifold 34. The compression module 10 therefore comprises in addition to the compressor 11, the subcooler 13 and accumulator 15, with the module, if desired, comprising multiple compressors feeding the same or different loads and with the accumulator coil 51 and the subcooler coil 24 functioning to improve system thermal efficiency by subcooling any of the liquid refrigerant as received from the various coils 12, 14, 16, 18, 20 and 22 which may be functioning as condensers within the closed refrigeration loop defined by the system and delivered to the receiver 26. The unit housing 10a is further partitioned at 10b and 10c to form module compressor, accumulator and subcooler sections. The liquid refrigerant R within the receiver is circulated through the subcooler coil 24 under all modes of operation prior to being directed to a selected coil or coils functioning as evaporators under given modes of system operation.

The outside air coil 12 is placed external of the building 62 to be conditioned. The storage coil 14 is immersed within a heat storage media $M_1$ which may be a suitable liquid such as high temperature oil, silicone, etc., within an insulated storage tank or the like at 58. The direct solar coil 16 is also mounted within a similar insulated tank as at 60 and bears a heat storage media $M_2$ which may again be a high temperature oil or silicone, etc. In the illustrated embodiment, inside coil 18 constitutes an air coil as does inside coil 20, while the hot water coil 22 is immersed within an insulated hot water tank 64 bearing a mass of water W which is required to be heated to a temperature normally in excess of the air temperature within the space 63 of the building 62, conditioned by inside coil 18.

In addition to these components of the heat pump system of FIG. 1, there is additionally provided a seal pot at 36 and a positive displacement pump 38 for outside air coil as well as similar seal pots 37 and 40 and pumps 39 and 42 for storage coil 14, and inside air coil 18, respectively. The pumps function to pump condensed refrigerant positively towards the receiver 26 which is at a pressure lower than that condensed within any of the coils acting as high pressure condensers for the system.

Further, the system includes a number of solenoid operated control valves $V_1$ through $V_{21}$ inclusive and check valves $C_1$ through $C_{17}$ inclusive. The solenoid operated control valves are of the normally closed when de-energized type and control refrigerant flow in either liquid or vapor form to and from the coils 12, 14, 16, 18, 20 and 22 as well as the compression module 10. The check valves function to prevent flow in one direction but permit flow in another within the piping for the refrigeration circuit.

Utilizing the compression module 10 as an initial basis of reference, the compressor module comprises compressor 11 and subcooler 13. The compressor is provided with a discharge port 46 and a suction port 44. In terms of the illustrated embodiment, the compressor 11 is assumed to be a helical screw rotary compressor, and is provided with a compression chamber 17. A pair of liquid refrigerant ejection ports as at 48 and 56 permit refrigerant compressed to an intermediate pressure to be discharged from the compression module rather than at full discharge pressure as provided by way of discharge port 46. Additionally, the helical screw rotary compressor in this case is provided with a refrigerant vapor return or injection port 50. A second injection port 55 connected to the subcooler 13 for permitting the vaporized intermediate pressure refrigerant vapor employed in subcooling the refrigerant passing from the receiver 26 to liquid feed manifold 32 to return to the compressor 11 at a point within the compression process which is above the pressure of the suction port 44 but below the pressure at discharge port 46 of that compressor.

As mentioned previously, an important aspect of the present invention is the employment of the modular concept to the refrigeration system, particularly for heat pump use in which not only may a helical screw rotary compressor compression module or in the alternative a multi-cylinder reciprocating compressor compression module having multi-level capabilities be interchangeably employed, but regardless of the nature or make up of the compressor itself, the compression module 10 may be connected to any number of coils by way of four primary manifolds; discharge manifold 28, suction manifold 30, liquid feed manifold 32, and liquid drain manifold 34. In this manner, some of the coils may be eliminated or in fact additional coils may be provided for obtaining thermal energy from sources other than the outside air or solar impingement or provide for additional load carrying capability such as, for instance, a heat recovery coil borne by a computer room or the like within building 62 or an end use of load coil such as a heating coil functioning in desiccant dehumidification as for instance within the basement of the building 62, for example.

The compressor discharge port 46 is connected to the discharge manifold 28 by line 66, the suction manifold 30 connects indirectly to the suction port 44 of the compressor 11 by line 68. The subcooler coil outlet port 52 of the compression module 10 connects the subcooler coil 24 to the feed manifold 32 through a line 70 which exits from the compression module 10 at point or port 52 and connects to the manifold at point 72.

In turn, the liquid drain manifold 34 is connected to the receiver 26 by line 74 and the receiver itself is connected to the inlet side of the accumulator coil 51 by way of port 53 of the compression module 10 through line 76. Accumulator coil 51 connects to subcooler coil 13 at port 54. In order to effect subcooling, a branch or bleed line 78 emanates from line 70 at point 80 leading to the liquid feed manifold 32 and opens to the interior of the subcooler 13 at subcooler bleed line supply port 57. In turn, the vaporized refrigerant exits from the subcooler 13 at subcooler vapor return port 59 via line 74 which connects at its opposite end to injection port 55 of the compressor 11. Flow control is effected within line 78 by way of solenoid operated control valve $V_{21}$. Suction manifold 30 connects indirectly with compressor suction port 44, via accumulator section 15 of module 10 through lines 68 and 68'. Line 68' connects port 44 of the compressor to port 47 of the accumulator 15. Line 68 connects to port 45.

The modulator nature of the system of FIG. 1 may be appreciated by further reference to the connections for the various coils 12, 14, 16, 18, 20 and 22. For instance, line 82 leads from the discharge manifold 28 at point 83 to the outside air coil 12 and bears a solenoid operated control valve for controlling the feed of compressed refrigerant vapor to the outside air coil 12 when it functions as a condenser. The outside air coil 12 includes connection points 84 and 86 at opposite ends of the same. When the coil 12 functions as a condenser, condensed liquid refrigerant is directed to the liquid drain manifold 34 by line 88 which connects at one end at point 86 to the outside air coil 12 and at its opposite end at point 90 to the liquid drain manifold 34. Within line 88, is the seal pot 36 and the pump 38 as well as check valve $C_{14}$. Pumps 38, 39 and 42 are of the conventional gas powered piston recycle type. Where the pressure is sufficiently high within line 88 to cause condensed refrigerant from the seal pot 36 to flow to the receiver 26 through the liquid drain manifold 34, the flow will bypass pump 38 through a bypass line 92 which includes check valve $C_7$. The bypass line 92 returns to line 88 upstream of check valve $C_{14}$. Dealing with each coil in turn, and realizing that the outside air coil 12 can function as an evaporator coil with liquid refrigerant being fed thereto from receiver 26, after appropriately subcooling by subcooler 13, the liquid refrigerant within the liquid feed manifold 32 is directed to the outside air coil through line 94 which connects to the liquid feed manifold at point 96 at one end and to the outside air coil at point 86 at its opposite end. The line 94 includes the solenoid operated control valve $V_{15}$ which, when energized, opens to permit liquid refrigerant feed to the outside air coil 12 which then functions as an evaporator. In that respect, and with respect to storage coil 14, direct solar coil 16, inside coil 18 and inside coil 20, these coils are provided with appropriate restrictions or thermal expansion valves (not shown) to cause the required pressure drop and vaporization of the refrigerant within the coils for extracting heat from the environment of the coils and providing heat to the refrigeration loop, when functioning as evaporators.

At the opposite end of the outside air coil 12, and specifically at point 85, there is connected a further line 96, which connects to the suction manifold 30 at its opposite end, at point 98, to permit the vaporized refrigerant to return to the suction port 44 of the compressor 11. Line 96 includes the solenoid operated control valve $V_1$ and in series therewith a check valve $C_1$ which permits return refrigerant flow to the suction manifold 30 but prevents flow in the opposite direction through line 96. The check valve $C_1$ is upstream of the connection point 85 of line 82 leading from the discharge manifold 28 to the outside air coil 12.

While the operation of the outside air coil 12 both in its condenser and evaporator modes, may be readily evident from the above description, the function of this outside air coil with respect to system operation, depending upon the various modes of system operation, will be discussed in detail hereinafter.

Turning next to the storage coil 14, it may be seen that a line 100 leads from the discharge manifold 28 at point 102 and connects to line 106 at point 104, to one side of the storage coil; the storage coil being connected at its opposite side as at point 110 by way of line 112 to the liquid drain manifold 34 at point 114. Line 112 bears check valve $C_8$, permitting condensed liquid refrigerant to flow to the receiver but preventing reverse flow, in addition to seal pot 37 and pump 39. Bypass line 93 includes check valve $C_{15}$ and bypasses pump 39 within line 112. A solenoid operated control valve $V_5$ is provided within line 100 for selectively controlling the flow of compressed refrigerant vapor to the storage coil 14 from the discharge manifold 28. Additionally, a line 116 is connected at one end at point 118 to the liquid feed manifold 32 and connects to point 110 to one side of storage coil 14, this line including a solenoid operated control valve $V_{16}$ which, when energized, permits liquid refrigerant feed to the storage coil when it functions as an evaporator to remove heat from the storage coil for supply to the system, in this case the vaporized refrigerant returning to the suction manifold 30 through line 120 which connects to line 106 at point 104 at one end and to the suction manifold at point 122. Line 120 bears the check valve $C_3$ permitting vaporized refrigerant flow to the suction manifold but no return flow to the coil 14 in the opposite direction, with this flow being controlled by the operation of solenoid operated control valve $V_3$, in series therewith.

For both the storage coil 14 and the outside air coil 12, there are means provided for permitting compressed refrigerant vapor at an intermediate pressure, that is, below the discharge pressure provided at discharge port 46, to be supplied to these coils through line 124 which connects to the compressor 11 at ejection port 48 at one end, and which connects to one side of the outside air coil 12 at point 84 at its opposite end. Line 124 bears solenoid operated control valve $V_{18}$ and check valve $C_2$ for permitting the supply of intermediate pressure refrigerant vapor to the outside air coil in the absence of refrigerant vapor being supplied to that coil by way of the discharge manifold and line 82. In addition, at point 126 within line 124, a line 128 is connected thereto so as to selectively supply intermediate pressure vapor partially compressed by the compressor via the ejection port 48 to the storage coil 14 when coil 14 functions as a condenser. Line 128 connects to line 106 intermediate of connection points 104 and 108. The line 128 bears, in series, check valve $C_4$ and solenoid operated control valve $V_4$ and connects to line 106 at point 131.

Additionally, insofar as storage coil 14 is concerned, there is provided at point 108, line 130 which connects to the compressor 11 at injection port 50; this line 130 bearing solenoid operated control valve $V_{14}$ such that when the storage coil 14 functions as an evaporator coil, intermediate pressure refrigerant vapor can return to the compressor at a pressure above that of the vapor returning by way of suction manifold 30 and suction port 44 of the compressor but below that of the discharge port 46 of the same compressor.

Turning next to the direct solar coil 16, this coil functions during direct solar impingement (on a collector not shown) to supply thermal energy to the refrigerant loop, while to the contrary, the heat of the media $M_1$ within tank 58 bearing the storage coil may be stored over a period of time, as received from the same solar supply or from a totally different source such as heat reclaim energy from a computer room or the like within building 62. The nature of the storage of the heat within media $M_2$, derived from a solar source, is found in the prior applications referenced previously. Principally, the function of coil 16 is to act as an evaporator coil and to pick up heat from the media $M_2$ for delivery to the refrigeration loop. In this regard, a connection is made by way of line 132 at point 134 to the liquid feed manifold 30 which line 132 bears control valve $V_{17}$. It supplies refrigerant for vaporization to one side of the coil 16 at point 136 within line 138 bearing that coil. Line 138 is connected to the liquid drain manifold 34 at point 140. Line 138 bears a check valve $C_9$. The opposite side of the direct solar coil 16 at point 142 is connected to the suction manifold 30 through a line 144 connecting to the suction manifold 30 at point 146; line 144 bearing a solenoid operated control valve $V_6$ and, in series therewith, check valve $C_5$. Thermal energy may also be dissipated or to some extent stored within the solar coil media $M_2$ by causing coil 16 to function as a condenser. In this respect, line 148 leads from the discharge manifold 28 at point 150 and connects to point 142 at one side of the direct solar coil 16, line 148 bearing solenoid operated control valve $V_7$. When control valve $V_7$ is energized, and control valve $V_{17}$ is de-energized, the coil 16 functions as a condenser, and when solenoid operated control valve $V_{17}$ is energized and solenoid operated control valve $V_7$ is de-energized, the coil 16 functions as an evaporator coil supplying heat to the system with refrigerant vapor flowing to the suction manifold 30 from coil 16 for recompression.

Inside coil 18, which may be considered an inside air coil, functions to heat the space 63 interiorly of building 62 being conditioned, or cools that space, depending upon the nature of refrigerant flow within that coil. For heating, there is provided a line 152 which connects at one end to the discharge manifold 28 at point 154 and connects to line 156 leading to one side of the inside coil 18 at point 158. The connection point between lines 152 and 156 is 160. At the opposite side of the inside coil 18, at point 162, a line 164 leads to the liquid drain manifold 34 connecting to that manifold at point 166. The line 164 bears the seal pot 40, and in series therewith, the pump 42 along with check valve $C_{10}$ permitting flow in a direction from the inside coil 18 to the liquid drain manifold 34 but not vice versa.

A bypass line 168 extends about the pump 42 and is provided with a check valve $C_{11}$ which permits flow from the seal pot to the liquid drain manifold and through the second check valve $C_{10}$. This action occurs when the inside coil 18 is functioning as a condenser under heating mode to provide heat to the space 63 being conditioned within building 62. Alternatively, heat may be extracted therefrom. The bypass line 168 functions to bypass the pump 42 whenever the receiver pressure is equal to or below that of coil 18. In addition to receiving compressed refrigerant vapor from the compressor discharge port 46, via the discharge manifold 28, the inside coil 18 may receive intermediate pressure refrigerant, that is, partially compressed refrigerant vapor from the compressor by way of ejection port 56 and a line 170 which connects at one end to port 56 and at the opposite end to permit 158 within line 156 to one side of coil 18. The line 170 includes in series a solenoid operated control valve $V_8$ and a check valve $C_6$ permitting flow from the ejection port 56 to the coil 18 but not vice versa.

To permit the inside coil 18 to extract heat from the space 63 being conditioned, there is provided a line 172 emanating from the liquid feed manifold 32 at point 174 and leading to point 162 of line 164; line 172 bearing a solenoid operated control valve $V_{19}$ for controlling the flow of liquid refrigerant to the inside coil when it functions as an evaporator. Line 156 is connected at one end at point 160 to the inside coil 18 and at its opposite end to the suction manifold 30 at point 176; that line 156 including a valve $C_{16}$ and control valve $V_{10}$. By energization of solenoid operated control valves $V_{10}$ and $V_{19}$, liquid refrigerant may be fed from the liquid feed manifold 32 to the inside coil 18 where it vaporizes and returns to the compressor via the suction manifold 30.

The inside coil 20, as mentioned previously, may be part of a hydronic heating and cooling system. That is, it may be immersed within a liquid such as water which is circulating about the perimeter of the building and being connected to building radiators so as to supply heat or cool depending upon the mode of operation of the system and whether the inside coil 20 is functioning as an evaporator or a condenser. In that regard, and when it functions to supply heat to the space 65 of building 62, hot refrigerant vapor under pressure is supplied from the discharge manifold by line 178 connected to the manifold at 180 and at its opposite end to the inside coil 20 at point 182, the condensed refrigerant leaving the inside coil 20 at its opposite side or point 184 and feeding to the liquid drain manifold 34 by way of line 186 which connects to that manifold at point 188. Line 186 bears the check valve $C_{12}$ for insuring liquid refrigerant flow in a direction from the inside coil 20 to the liquid drain manifold 34 but not in the opposite direction through that line. When the inside coil 20 functions as an evaporator, during cooling mode, liquid refrigerant is directed from liquid feed manifold 32 to the inside coil 20 by way of line 190 which connects to the liquid feed manifold 32 at point 192 at one end and at its opposite end to point 184 within line 186. The line 190 includes a solenoid operated control valve $V_{20}$ which when energized permits flow of liquid refrigerant towards the inside coil 20 for vaporization therein. The vaporized refrigerant returns to the compressor by way of suction manifold 30 through line 194 which connects to coil 20 at point 182 at one end and to the suction manifold 30 at point 196. Line 194 bears check valve $C_{17}$ and control valve $V_{12}$ which, when energized, makes suitable connection between the coil 20 and the suction manifold 30.

The last coil 22 of the illustrated embodiment functions to heat the water W within the hot water tank 64 and acts only as a condenser, never as an evaporator. In that respect, the coil 22 connects by way of line 198 to the discharge manifold 28 at point 200 at one side while the opposite side of the same coil 22 connects by way of line 202 to the liquid drain manifold 34 at connection point 204 to permit the condensed, hot refrigerant to flow to the receiver 26. Line 202 bears a check valve $C_{13}$ which permits flow from the hot water coil 22 towards the receiver 26 but prevents reverse flow. Thus, the coil 22 cannot function as an evaporator. Flow is controlled to the hot water coil by means of the solenoid operated control valve $V_{13}$ within line 198, leading to the opposite side of the hot water coil from check valve 12.

The operation of the modular system of the present invention may be appreciated by reference to FIGS. 1a through 1j inclusive showing the various modes of operation and the utilization of all or only some of the coils connected by way of the manifolds.

Reference to FIG. 1a shows the heat pump refrigeration system in a heating mode utilizing the outside air coil as a source of heat only and with the inside coil 18 and inside coil 20 extracting heat from the system for heating of space 63 and space 65 by respective coils 18 and 20. There is no heating of the water W within tank 64 by the hot water coil 22. As seen by the tables in the lower right hand corner showing the energization of the solenoid operated control valves or lack of energization thereof to complete the closed loop flow path, it may be appreciated that the solenoid operated control valves are responsive to control parameters including the temperature of the space being conditioned as at 63 as well as that at 64, the temperature of the water W within tank 64, as well as the available heat source temperatures for media $M_1$ of tank 58, media $M_2$ of tank 60 and the outside air temperature passing over coil 12. Such control parameters are in accordance with the teachings of the prior cited applications and issued patents of which this is a continuation-in-part. Further, in terms of supplying in a selective manner partially compressed or intermediate pressure refrigerant working fluid, that is, from compressor 11, to the coils such as inside coil 18 via injection port 56, outside air coil 12 via ejection port 48, or the delivery return of intermediate pressure refrigerant vapor to the injection ports 50 and 55 of the compressor 11 as from coil 14 and subcooler 13, again, the energization of the appropriate control valves are effected. This may be effectively achieved and is automatically accomplished by means of a control panel as per the prior applications upon receipt of input signals indicative of temperature and pressure parameters within the heat pump system. Control signals are applied to the various solenoid operated control valves as directed by that control panel. It is believed evident, however, that by means of the tables, accompanying each of the figures showing the various modes of operation, and indicating the condition of the solenoid operated control valves in terms of being open or closed, that is, energized or de-energized, and the condition of the pumps 38, 39 and 42, the operation of the system may be fully appreciated and the effect readily seen.

In this respect, in FIG. 1a, solenoid operated control valves $V_1$, $V_9$, $V_{11}$, $V_{15}$ and $V_{21}$ are energized and open, while solenoid operated control valves $V_2$ through $V_8$ inclusive, $V_{10}$, $V_{12}$, $V_{13}$, $V_{14}$, and $V_{16}$ through $V_{20}$ inclusive are de-energized and closed. Pumps 38, 39 and 42 are off. Thus, compressed refrigerant vapor discharging from discharge port 46 of the compressor 11 and supplied to the discharge manifold 28 is caused to flow to the inside coil 18 through line 152 by energization of solenoid operated control valve $V_9$, where condensation occurs with the liquid refrigerant bypassing pump 42 and flowing to the liquid drain manifold 34 and thence to receiver 26. Further, in parallel therewith, and by way of lines 178 and 186, additional high pressure vaporized refrigerant vapor flows to the inside coil 20 by energization of solenoid operated control valve $V_{11}$ for condensing therein, it being assured that both coils 18 and 20 are condensing at the same temperature, i.e. 70° F. The subcooler 13 and accumulator in the illustrated embodiment of the present invention are always operative and permit improved efficiency in system operation, and in this regard, solenoid operated control valve $V_{21}$ is energized and open to subcool the liquid refrigerant being supplied in this case solely to the outside air coil 12 through line 94 upon energization of solenoid operated control valve 15. Return refrigerant vapor returns to the suction manifold 30 via line 96 as a result of energization of solenoid operated control valve $V_1$ and thence to the suction port 44 of the compressor 11 via lines 68,68'.

In addition to employing staging of a reciprocating compressor (is such is employed) or as illustrated the helical screw rotary compressor 11, and use of injection and ejection ports, the drive motor for the compressor may be of the two speed type so as to provide varying capacity for the compressor, particularly where the compressor constitutes a multiple cylinder reciprocating compressor and is not otherwise provided with capacity control means. Conventionally, a capacity control slide valve is provided to the helical screw rotary compressor, and such may be incorporated within compressor 11 although not shown.

Figure 1B:
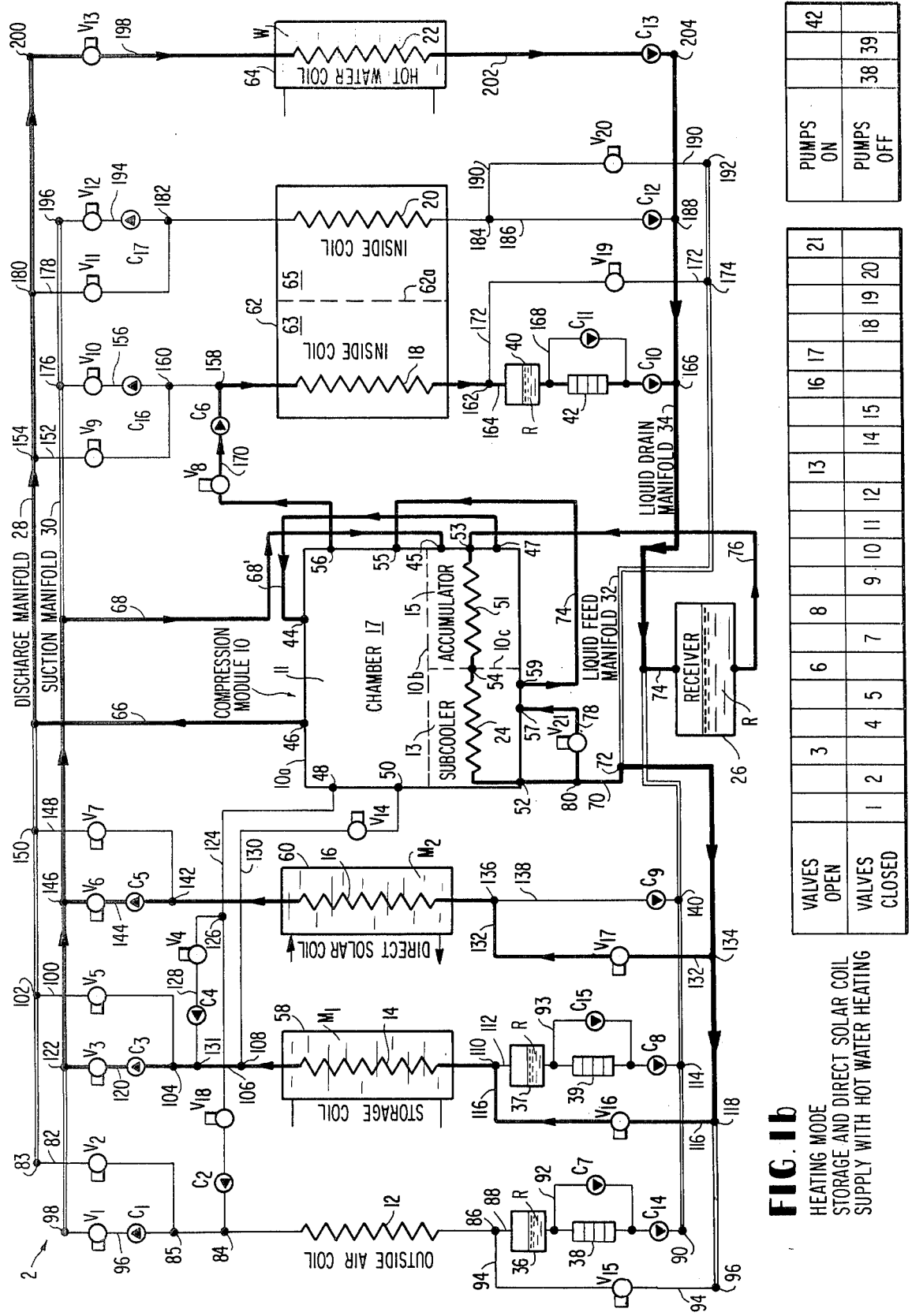
FIG. 1b is a schematic diagram of the heat pump system of FIG. 1 under heating mode with heat supplied by the storage coil and the direct solar coil only.

Referring next to FIG. 1b, the system is shown in heating mode with the storage coil and the direct solar coil supplying thermal energy to the inside coil 18 and the hot water coil 22 under conditions in which the temperature of the outside air is so low that the system needs are more efficiently met by the higher temperatures of the medias $M_1$ and $M_2$ of tanks 58 and 60.

In this case, solenoid operated control valves $V_1$, $V_2$, $V_4$, $V_5$, $V_7$, $V_9$, $V_{10}$, $V_{11}$, $V_{12}$, $V_{14}$, $V_{15}$ and $V_{18}$ through $V_{20}$ remain closed, while solenoid operated control valves $V_3$, $V_6$, $V_8$, $V_{13}$, $V_{16}$, $V_{17}$, and $V_{21}$ are energized and open. With respect to the inside coil 18, refrigerant from ejection port 56 flows through line 170. Further, with respect to the compression module 10, compressor discharge as at 46 also feeds coil 22 functioning as a condenser in the system, and the vaporized refrigerant returning to the compressor enters the suction port 44 from the suction manifold 30 with the exception of the subcooler return which is effected by way of line 74 to the subcooler coil compressor injection port 55 as in FIG. 1a. In this case, the outside air coil 12 does not function as an evaporator and does not supply heat to the system, this being provided by the storage coil 14 and direct solar coil 16. The heat is extracted from media $M_1$ within tank 58 and from media $M_2$ of tank 60. It is assumed that media $M_2$ is being circulated to and from a solar collector (not shown) operatively coupled to the tank 60 in the manner of the referred to applications of which this application is a continuation-in-part. Liquid refrigerant R is pumped by pump 42 from seal pot 40 to receiver 26 in parallel to higher pressure condensed refrigerant from coil 22.

With solenoid operated control valves $V_3$ and $V_8$ energized, an appropriate fluid circuit is formed between the liquid feed manifold 32 and the suction manifold 30 insofar as coil 14 is concerned, while solenoid operated control valve $V_8$ in line 170 performs that function with respect to the direct solar coil 16.

Figure 1C:
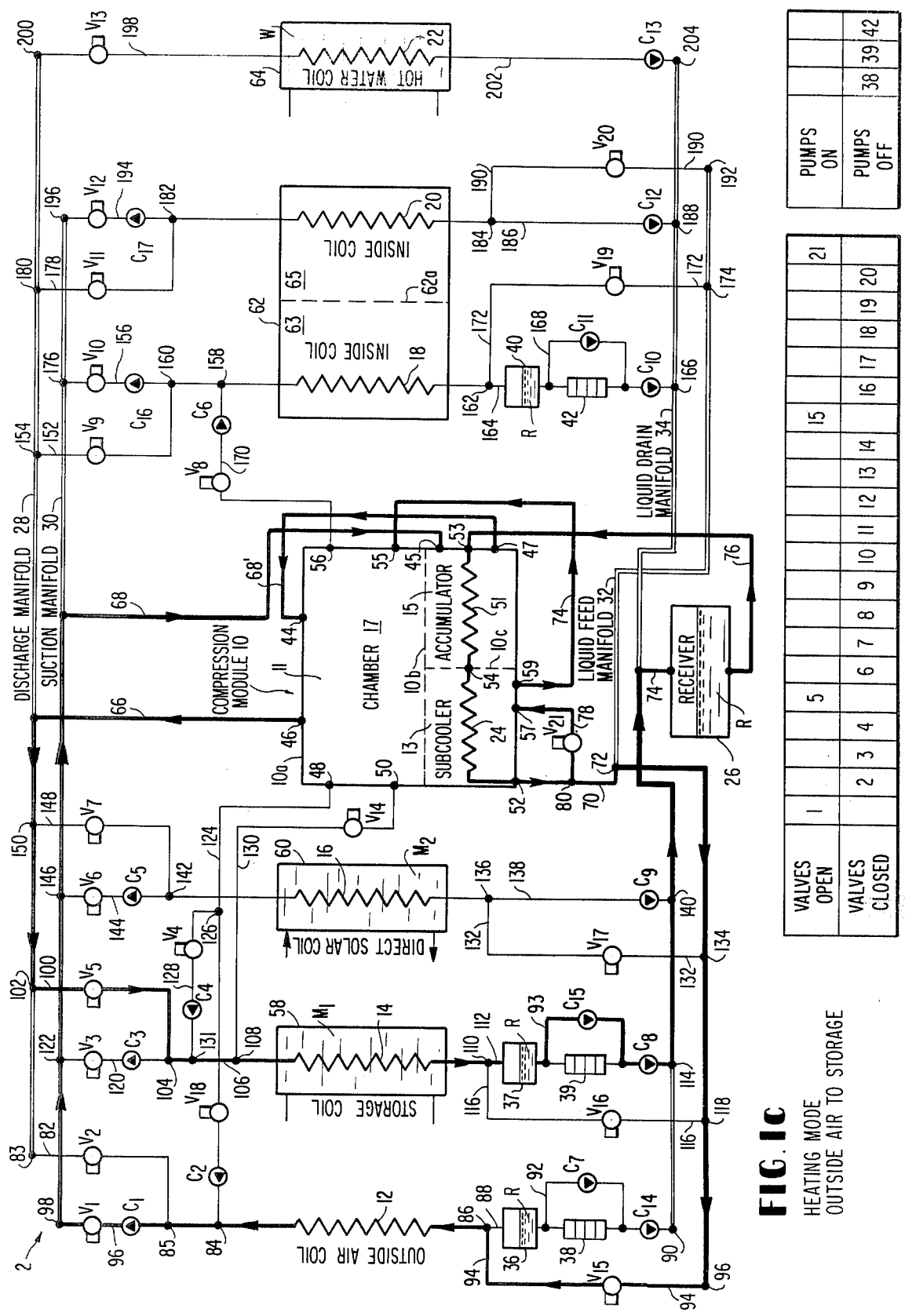
FIG. 1c is a schematic diagram of the heat pump system of FIG. 1 under heating mode with no heating or cooling requirements and with the storage coil receiving heat from the outside air.

Turning to FIG. 1c, the heat pump refrigeration system is shown in a heating mode with there being no requirements for heating or for that matter cooling of the space 63 and space 65 within the building 62 or the water W within hot water tank 64. In this case, the available heat as provided by the outside air coil is employed in supplying heat to the storage tank media $M_1$ by way of storage coil 14 and with no need to remove heat from the media $M_2$ of the direct solar coil 16. It is further assumed that the solar energy is available and sufficient for increasing the temperature of the media $M_2$ and that this is being done by the media circulation means between tank 60 and the solar collector (not shown).

Further, since the needs for heating within the building 68 or cooling are non-existant, excellent efficiency in the storage of heat within the storage tank 58 is achieved by full compression process of the compressor 11, and in that regard, in this heating mode, the refrigerant working fluid is discharged from the compressor at full pressure through the discharge port 48 and supplied to the storage coil 14, the liquid refrigerant R being subcooled by subcooler 13 and being directed through the liquid feed manifold 32 to the outside air coil 12 where vaporization occurs and the heat of the outside air is picked up and returned for supply to the storage coil 14 through the compressor 11 by way of suction manifold 30 and line 68, the refrigerant vapor returning to the compressor via suction port 44. In that respect, solenoid operated control valves $V_1$, $V_5$, $V_{15}$ and $V_{21}$ are open by energization thereof, while solenoid operated control valves $V_2$, $V_3$, $V_4$ through $V_{14}$ inclusive, and $V_{15}$ through $V_{20}$ inclusive remain de-energized and closed.

Depending upon the needs of various coils, the compressor 11 may be switched from the type of operation where the refrigerant vapor is fully compressed to that where it is ejected partially compressed at ejection port 48. In the embodiment of FIG. 1c, refrigerant vapor is discharged from the compressor 11 at high pressure by way of discharge port 46 and then flow by line 66 to the manifold 28 and thence to the storage coil 14 through line 100. In the case, solenoid operated control valve $V_4$ would be de-energized and closed and solenoid operated control valve $V_5$ would be energized and open.

Figure 1D:
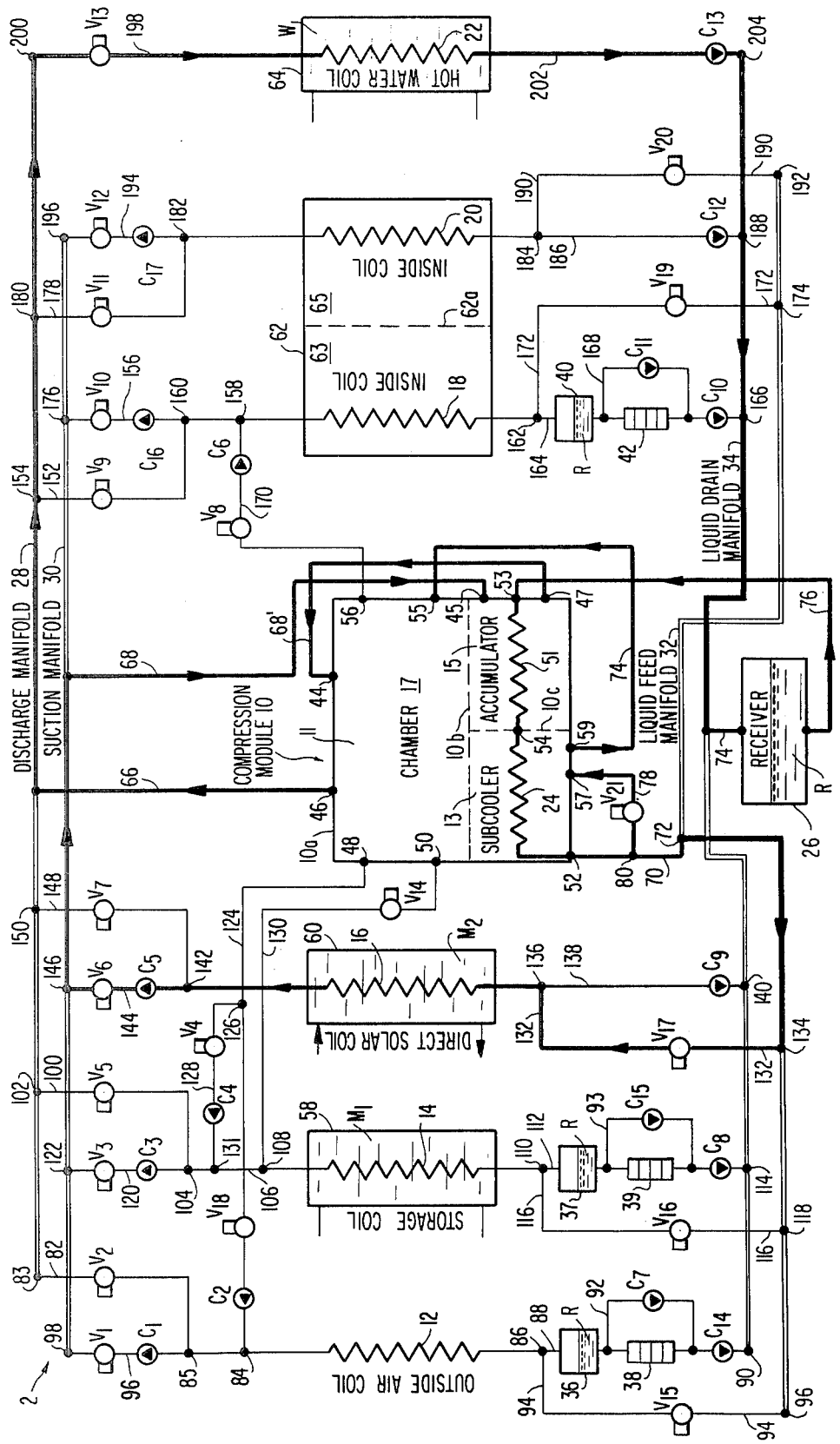
FIG. 1d is a schematic diagram of the heat pump system of FIG. 1 under heating mode with hot water heating directly from the direct solar coil.

Referring next to FIG. 1d, the heat pump system of the present invention is illustrated in a heating mode in which the outside air is too cold to efficiently extract heat therefrom and heat has been fully extracted from the storage media $M_1$ within tank 58. However, the current solar impingement on the collector (not shown) adequately supplies sufficient heat to the circulated media $M_2$ so as to provide thermal energy sufficient to heat part of the building 62 or its componentry. In this illustrative mode, there are no momentary requirements for heating of the interior of building 62. However, the water W within tank 64 is below temperature and it is being heated from the solar energy available from coil 16. Under this mode, solenoid operated control valves $V_1$ through $V_5$ inclusive and $V_7$ through $V_{12}$ inclusive, $V_{14}$ through $V_{16}$ inclusive, and $V_{18}$ through $V_{20}$ inclusive are closed, while valves $V_6$, $V_{13}$, $V_{17}$ and $V_{21}$ are open. All of the pumps 38, 39 and 42 are off. Thermal energy is picked up by coil 16 acting as an evaporator which receives refrigerant from subcooler 13 and returns the vaporized refrigerant by valve $V_6$ which is open through line 144 to the suction manifold 30 and to the compressor module suction port 44. Compressed refrigerant is discharged from the compressor at port 46 and feeds to the hot water coil 22 through the discharge manifold 28 with valve $V_{13}$ open. The condensed refrigerant is returned to the receiver 26, completing the loop.

FIG. 1e shows the system under heating mode with the heat being supplied solely from the storage coil 14 and with the heat being discharged from that coil to the outside by way of outside air coil 12, while some of the heat is being usefully employed in maintaining the desired temperature of the water W within tank 64 by utilizing the hot water coil 22 as a condenser. In that respect, valves $V_1$, $V_2$, $V_4$ through $V_{12}$ inclusive, $V_{14}$, $V_{15}$ and $V_{17}$, $V_{19}$ and $V_{20}$ are closed, while valves $V_3$, $V_{13}$, $V_{16}$, $V_{18}$ and $V_{21}$ are energized and open. Pump 38 is on while pumps 39 and 42 are off. Refrigerant vapor under high pressure is discharged from the compressor 11 at discharge port 46 and supplied to the discharge manifold 28, where refrigerant flows to the hot water coil 22 for condensation therein by energization of solenoid operated control valve $V_{13}$. This high pressure liquid refrigerant returns to the receiver 26. Partially compressed refrigerant vapor passes via line 125 to the outside air coil 12 which also acts as a condenser. However, since its temperature is lower than the condensing temperature within the hot water coil 22, which may be maintained at 120° F. while the outside air temperature may be 70° F., the condensed liquid refrigerant would normally tend to build up within the seal pot 36. However, by appropriate energization of pump 38, the liquid refrigerant is pressurized sufficiently to overcome the pressure of the refrigerant within the receiver 26. With solenoid operated control valve 21 energized, liquid refrigerant is subcooled at accumulator coil 51 and subcooler coil 24 and the subcooled refrigerant is vaporized within storage coil 14 to pick up the heat from media $M_1$ as a result of energization of solenoid operated control valve $V_{16}$ and flow to that coil through line 116. The refrigerant vapor from the storage coil returns to the suction port 44 of compressor 11 by way of suction manifold 30, via accumulator 15. This mode also covers nocturnal heat rejection.

FIG. 1f illustrates the system under heating mode, with the heat supplied from the cooling load required for building 62. In that regard, there is sufficient cooling load to balance the heat load required for the building space 63, and the inside coil 18 is acting as a condensor, while inside coil 20 is acting as an evaporator to remove heat from space 65 of building 62. In this illustrated mode, no heat is required for the water W of tank 64, it having reached its predetermined temperature. Further, the outside air coil 12 and direct solar coil 16 are not involved or required for this operation. Valves $V_1$ through $V_4$, $V_6$ and $V_7$, $V_9$ through $V_{11}$ inclusive and $V_{13}$ through $V_{19}$ inclusive are closed while valves $V_5$, $V_8$, $V_{12}$, $V_{20}$ and $V_{21}$ are energized and open. Only pump 42 is on. Since the needs for heating and cooling are relatively low, the inside coil 18 receives partially compressed refrigerant vapor discharging from the ejection port 56 and passing by line 170 to the inside coil 18, as a result of energization of solenoid operated control valve $V_8$. The receiver 26 is pressurized only by way of the condensed refrigerant from the inside coil 18, that receiver 26 delivering refrigerant to the accumulator coil 51 and the subcooler coil 24 for subcooling prior to passing the refrigerant to the feed manifold 32 and thence via line 190 to the inside coil 20 acting as an evaporator coil in this mode with solenoid operated control valve $V_{20}$ energized. The vaporized refrigerant returns from the inside coil 20 via suction manifold 30, accumulator 15, and suction port 44 to compressor 11. If the cooling needs for inside coil 20 increase, solenoid operated control valve $V_8$ is de-energized, and the compressor is forced to supply fully compressed refrigerant in vapor form by way of compressor discharge port 46, line 66, discharge manifold 28 and line 152 to the inside coil 18 with solenoid operated control valve $V_9$ energized. Excess heat is stored by storage coil 14.

Figure 1G:
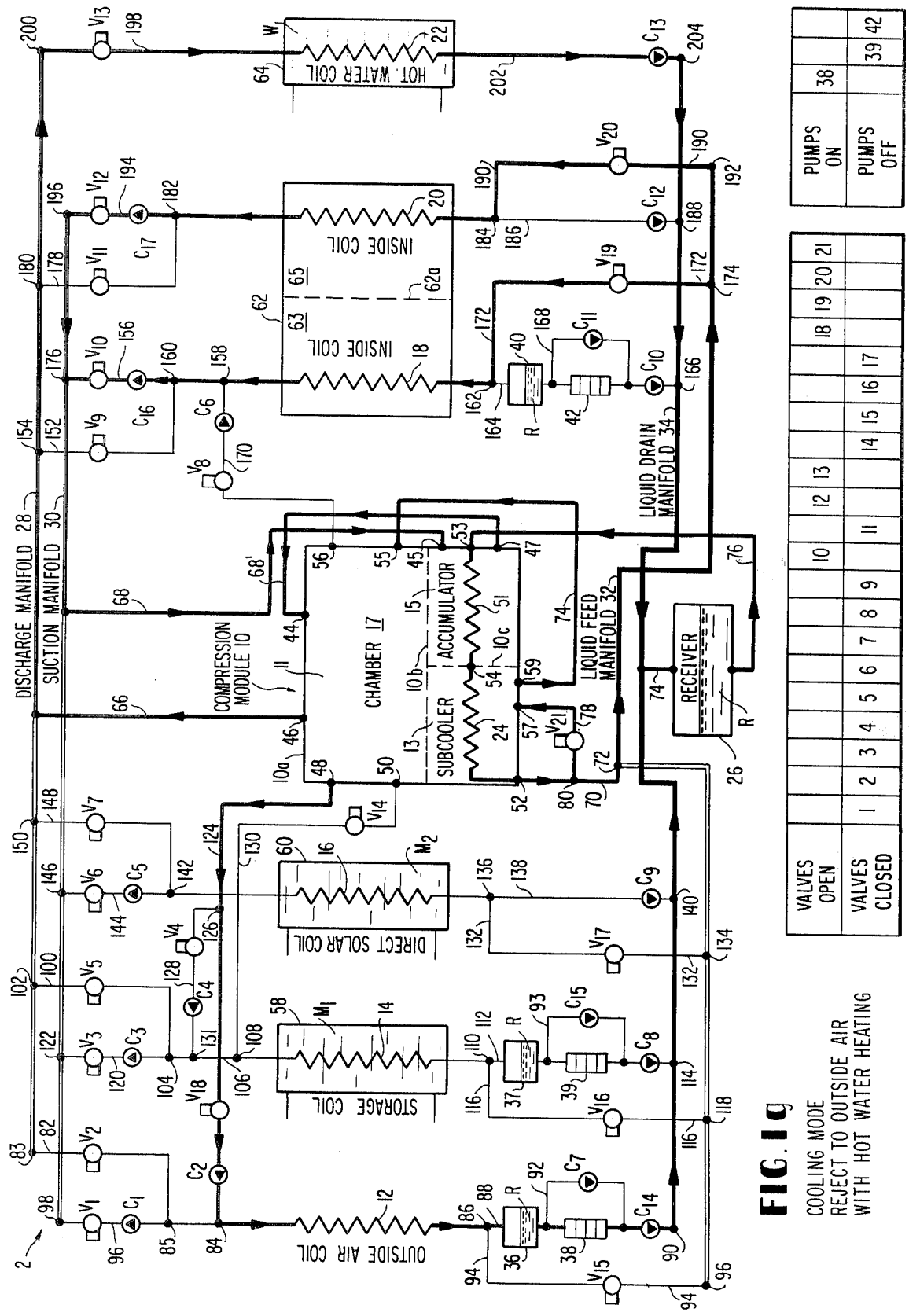
FIG. 1g is a schematic diagram of the heat pump system of FIG. 1 under cooling mode with heat rejection to the outside air and hot water heating.

FIG. 1g illustrates a cooling mode wherein thermal energy is rejected to the outside air and wherein thermal energy is supplied to the extent needed to the hot water coil 22 for heating water W within tank 64. In that respect, pumps 39 and 42 are off, 38 on, and valves $V_1$, through $V_9$ inclusive, $V_{11}$ and $V_{14}$ through $V_{17}$ inclusive, are closed, while valves $V_{10}$, $V_{12}$, $V_{13}$, and $V_{18}$ through $V_{21}$ are energized and open. The principal function under this mode is to cool spaces 63 and 65 inside building 62 with the inside coils 18 and 20 acting as evaporator coils. Refrigerant vapor returns from inside coil 18 through line 156 to the suction manifold 30, while vaporized refrigerant also returns from inside coil 20 through line 194 to the suction manifold and thence to the suction port 44 via accumulator 15, of compressor 11, with solenoid operated control valves $V_{10}$ and $V_{12}$ being energized. The fully compressed refrigerant discharges from discharge port 46 of compressor 11 and is passed to the discharge manifold 28, where refrigerant flows to the hot water coil 22 functioning as a condenser and heating the water W, the liquid refrigerant passing to the receiver 26 from that coil. Additionally, refrigerant in vapor form is directed via line 124 to the outside air coil functioning as a condenser and dissipating heat to the atmosphere. Since the outside temperature again is less than the temperature of the water W, the condensing temperature for coil 22 being in excess of that of coil 12, the pressure in the receiver is dictated by the condensation pressure within coil 22 and appropriately pump 38 must be energized to pump liquid refrigerant from seal pot 36 to the receiver 26 for circulation through the inside coils 18 and 20 acting as evaporators and return to the compressor. Energization of valve $V_{21}$ insures subcooling with the subcooling vapor returning to injection port 55 of the helical screw compressor 11. The evaporator function of coils 18 and 20 is dictated by the energization and opening of solenoid operated control valves $V_{19}$ and $V_{20}$ within lines 172 and 190 respectively.

FIG. 1h illustrates the heat pump system under cooling mode with limited heating and with heat supplied from storage. In that regard, the space 63 is being cooled, while simultaneously, space 65 of building 62 is being heated with inside coil 18 acting as an evaporator and inside coil 20 acting as a condenser. Insofar as the closed loop refrigeration circuit is concerned, there is more heat required for the inside coil 20 than is provided by the cooling effect within space 63 as defined by the evaporator coil 18, and the system must supply that additional heat. This is achieved by the storage coil 14 and at the same time the make up heat requirement is sufficiently low that high system efficiency is provided by the instant invention wherein the storage coil functions as a high pressure evaporator with high pressure vaporized refrigerant returning to the helical screw compressor 11 by way of injection port 50 and line 130. Solenoid operated control valves $V_1$ through $V_9$ inclusive, $V_{12}$, $V_{13}$, $V_{15}$, $V_{17}$, $V_{18}$ and $V_{20}$ are closed and de-energized, while solenoid operated control valves $V_{10}$, $V_{11}$, $V_{14}$, $V_{16}$, $V_{19}$ and $V_{21}$ are open. Pumps 38, 39 and 42 are all off. The compressor 11 discharges refrigerant at high pressure at discharge port 46 which flows to the discharge manifold 28, which pressurized refrigerant in vapor form is supplied to the inside coil 20 with solenoid operated control valve $V_{11}$ energized, the coil 20 functioning as the condenser and providing heating to space 65 within building 62. The liquid refrigerant returns to the receiver 26, it is subcooled by accumulator coil 51 and subcooler coil 24 with solenoid operated control valve $V_{21}$ energized, and the subcooled liquid refrigerant feeds in two directions within the feed manifold 32. A portion of the liquid refrigerant passes by way of line 172, with solenoid operated control valve $V_{19}$ energized and open, to the inside coil 18 functioning as an evaporator coil. The space 63 is cooled and that portion of the refrigerant vapor is returned to the suction port 44 of compressor 11. Additional liquid refrigerant is fed by way of line 116, through solenoid operated control valve $V_{16}$, which is open, to the storage coil 14 functioning as an evaporator coil and picking up heat from the media $M_1$ such that the storage media supplies a portion of the heat in addition to that provided by the inside coil 18 for heating inside coil 20 and space 65. Since the requirements for heat from the storage coil 14 and media $M_1$ are relatively low, the coil 14 acts as a high pressure evaporator coil returning refrigerant vapor at high pressure to injection port 50 by way of line 130 with solenoid operated control valve $V_{14}$ energized and open. This refrigerant vapor is compressed along with that provided at suction port 44 to full discharge pressure for discharge at port 46 and return to the discharge manifold 28, completing the loop.

Turning next to FIG. 1i, the heat pump system is illustrated in a cooling mode with limited heating and with excess heat rejected to outside air. The inside coil 18 is functioning as an evaporator coil with cooling required for space 63, while limited heat is being supplied to space 65 through inside coil 20 functioning as a condenser. Since the heating load of coil 20 is below the cooling load of coil 18, there cannot be a trade off between these coils, and outside air coil 12 comes into play, functioning as a condenser and providing limited heat rejection. In that regard, the compressor 11 is not forced to compress all of the refrigerant to discharge pressure and a portion of the refrigerant leaves the compressor through ejection port 48 and is carried to the outside coil 12 through line 124 with solenoid operated control valve $V_{18}$ being energized and open. Since the inside coil 20 is also under heating mode, and since its temperature is somewhat higher than the temperature of the outside air, it functions to define the pressure within receiver 26 as it acts as the highest pressure condenser for the system. Valves $V_1$ through $V_9$ inclusive, $V_{12}$ through $V_{17}$ inclusive and $V_{20}$ are closed and de-energized, while valves $V_{10}$, $V_{11}$, $V_{18}$, $V_{19}$ and $V_{21}$ are energized and open. Pump 38 is on, while pumps 39 and 42 are off. The highest useful load is undertaken by coil 18 functioning to cool space 63 within building 62, the coil 18 acting as an evaporator and receiving subcooled liquid refrigerant from the liquid feed manifold 32 through line 172 with solenoid operated control valve $V_{19}$ open. Solenoid operated control valve $V_{10}$ is energized and the refrigerant vapor returns to the suction port 44 of compressor 11 by way of suction manifold 30. Partially compressed refrigerant vapor is ejected through ejection port 48 of the compressor 11 and passes by way of line 124 to the outside air coil 12 functioning as a condenser with valve $V_{18}$ energized and open. The condensed refrigerant discharges into the seal pot 36 and is returned by pump 38 through the liquid drain manifold 34 to the receiver 26. Simultaneously, the fully compressed refrigerant vapor discharged from the compressor 11 at port 46 is delivered to the discharge manifold 28 and by way of energization of solenoid operated control valve $V_{11}$, the vaporized refrigerant flows through line 178 to the inside coil 20 which is functioning as a high pressure condenser with the condensed high pressure refrigerant liquid also returning to the receiver 26. Coil 20 dictates the receiver pressure. The receiver delivers liquid refrigerant by way of accumulator coil 51 and subcooler coil 24 as a result of energization of solenoid operated control valve $V_{21}$ to the liquid feed manifold completing the loop.

The versatility of the system of the present invention may be further appreciated by reference to FIG. 1j which shows the system under cooling mode with hot water heating and excess heat to storage. In this mode, both inside coils 18 and 20 are functioning as evaporators, while the coils 22 and 14 are functioning as condensers. As far as the system is concerned, the useful load comprises a cooling load for space 63 via coil 18, a cooling load for space 65 via coil 20, and a heating load by way of the hot water coil 22 for the water W within the water tank 64. There is more heat generated in the cooling of spaces 63 and 65 than is necessary to heat the hot water W, and the excess heat in this case is directed to the storage media $M_1$ for storage within tank 58. In that regard, liquid refrigerant from the liquid feed manifold 32 is supplied to the inside coils 18 and 20 and the compressor discharge gas is discharged at port 46 and directed to the discharge manifold 28 for feeding the hot water coil 22 and the storage coil 14. Pump 38 is off, pump 39 is on, and pump 42 is off. Valves $V_1$ through $V_4$ inclusive, $V_6$ through $V_9$ inclusive, $V_{11}$ and $V_{14}$ through $V_{18}$ inclusive are de-energized and closed, while valves $V_5$, $V_{10}$, $V_{12}$, $V_{13}$ and $V_{19}$ through $V_{21}$ inclusive are energized and open. With solenoid operated control valves $V_{19}$ and $V_{20}$ energized, liquid refrigerant flows to the inside coil 18 and the inside coil 20 through lines 172 and 190, respectively, returns to the suction port 44 of compressor 11 by way of suction manifold 30 and accumulator 15 with the solenoid operated control valves $V_{10}$ and $V_{12}$ being energized. The return vapor is fully compressed and discharged by compressor 11 at discharge port 46 where it is supplied through line 66 to the discharge manifold 28. This flow via control valve $V_{13}$ passes to the hot water coil 22 when solenoid operated control valve $V_{13}$ is energized, this coil functioning as a high pressure condenser, since the water temperature is at a higher temperature than the temperature of the media $M_1$ of storage coil 14 which is functioning as the other condenser within the closed loop. Therefore, the storage coil which receives its compressed refrigerant through line 124 upon energization of solenoid operated control valve $V_4$, is required to have pump 39 energized so that the liquid refrigerant within the seal pot 37 can return to the receiver 26 which is at a pressure defined by the condensation temperature of coil 22, determined by the temperature of the water W. With solenoid operated control valve $V_{21}$ energized, the refrigerant is subcooled within accumulator coil 15 and subcooler coil 24 prior to delivery to the liquid feed manifold 32 and the completion of the loop.

The description of FIGS. 1a through 1j inclusive is exemplary only of different operations of the system depending upon heating or cooling modes and therefore the requirements of the spaces 63 and 65 to be conditioned and the need for maintaining of a predetermined high temperature for the water W within the hot water storage tank 64 as well as the availability of heat from the outside air via coil 12, from storage media $M_1$ via coil 14 or storage media $M_2$ via coil 16, or the ability of the medias $M_1$ and $M_2$ to absorb and store heat, and it can be appreciated that system operations involving combinations and permutations other than those illustrated and described may be employed with high system efficiency and with mimimal control equipment and piping by the utilization of the compression module and the manifold scheme of the present invention.

Further, the heat pump system of FIG. 1 may be advantageously employed in a system, such as shown in FIG. 2, where like elements are given like numeral designations, which utilizes direct heat input or removal from the hot water tank 64, the spaces 63, 65 being conditioned as well as the storage tank 58 and the utilization of additional equipment such as a desiccant type dehumidifier, as at 210.

Further, in addition to storage tank 58, tank 218 is designated as an additional reclaim source, which in this case may constitute a computer room or the like (not shown) within building 62 which continuously provides heat regardless of the time of year as there is always excessive heat above that of room temperature within space 63, for instance, of the building 62 of which sapce, only a portion would be occupied by the computer room.

In the block diagram of FIG. 2, it may be seen that the heat pump acts as an intermediary between the storage tank 58 and the conditioned spaces 63, 65 and between the outdoor air coil 12 and the storage tank 58, the domestic hot water heater 64 and the storage tank 58, or between these elements and the source of solar radiation comprising collector 212 receiving radiant energy as indicated by the arrows 214 which radiation is directed to an end use device 220 and thence to the system via the heat pump. End use device 220 allows power generation to be achieved and the waste heat from the loop can be fed into the integrated thermal solar system in the manner shown in FIG. 2. The notes accompanying the block diagram are self explanatory. The directions of the arrows show permissible energy flow direction whether it be pick up or rejection or energy conversaion as electrical power generation. The letter R designates the refrigerant which flows between componentry, S designates the collector fluid such as high temperature oil silicone, etc., W designates water which may be circulated in a positive manner between the storage tank and the reclaim source irrespective of the refrigerant loop or the silicone collector fluid. R' indicates the liquid refrigerant pump operation, that is, the free nocturnal or other time dissipation when the tank temperature is greater than the air temperature and the computer selects dissipation as from the tank to the outdoor air coil. The duplicate liquid refrigerant pump operation to conditioned space allows simultaneous heating and cooling modes for respective coils such as 18 and 20 for the conditioned space 63, 65, allows simultaneous heating and cooling modes or both coils solely on heating or cooling mode alone as desired and in conformance with FIGS. 1a–1j, or otherwise. Obviously, both the collector fluid and water can be pumped between componentry both individually and jointly (within separate conduits) to achieve the desired action for the integrated thermal solar system of FIG. 2 and incorporating the invention of FIG. 1.

FIG. 2 is indicative in block form of the great versatility and compact nature of the instant system as applied to cooling and heating needs for a given building having diverse coil environments for heat pick up and dissipation.

Figure 3:
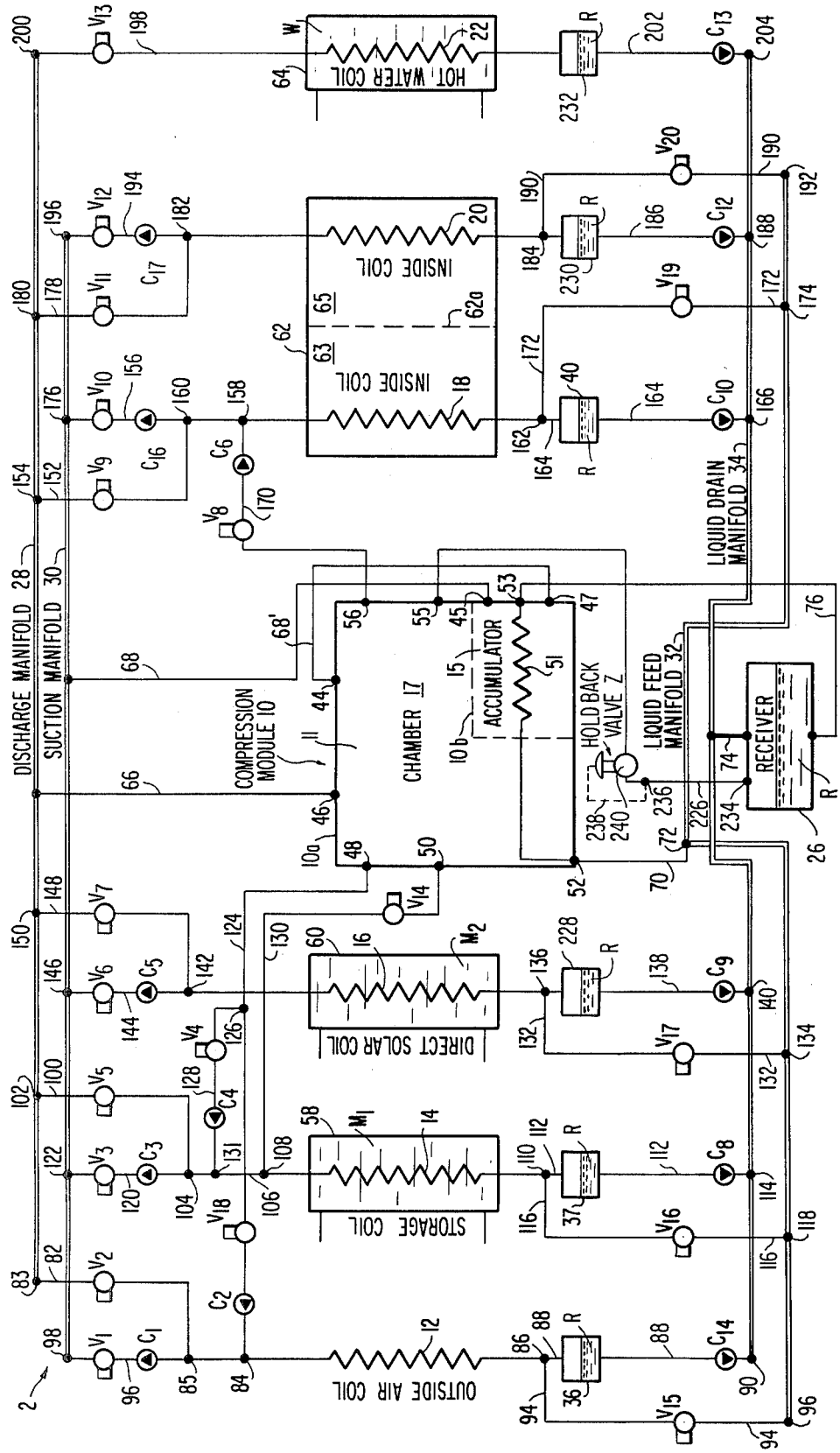
FIG. 3 is a hydraulic schematic diagram of a second heat pump system embodiment of the present invention.

An alternative embodiment of the invention is shown in FIG. 3. Like elements bear like numeral designations. In addition, the subcooler 13, its subcooler coil 24 and solenoid operated control valve $V_{21}$ are eliminated. Line 138 bears a seal pot 228. Line 186 bears a seal pot 230, and line 202 bears a seal pot 232. The necessity for pump means such as the positive displacement pumps 38, 39 and 42 are eliminated, and in addition, the bypass circuits about the pumps. Thus, every shown condensing coil is equipped with a seal pot. In this case, the seal pot incorporates a high side float (not shown). The receiver pressure then becomes controlled by a new element, constituting a hold back valve Z. The hold back valve is found within a line 226 leading from the receiver and opening at point or port 234 within the receiver above the accumulated refrigerant R and leading to the compressor injection port 55. Additionally, it should be kept in mind that in both the embodiments of FIGS. 1 and 3, there is a necessity for only one ejection port and one injection port (assuming that the intermediate pressure points for removal of compressed vapor from the compressor 11 or the injection of partially expanded vapor at an intermediate pressure therein are essentially the same). In fact, ports 48 and 56 may be synonymous as well as for ports 50 and 55. In the embodiment of FIG. 3, it is important only that the pressure in the receiver be determined by a hold back valve which feeds expanded vapor to compression chamber 17 at port 55, this vapor being at an intermediate pressure, that is, above suction but below discharge. The hold back valve includes a line 238 which senses the pressure downstream of the valve element 240 within line 226, line 238 being connected to line 226 at point 236 such that the hold back valve Z opens when the differential between the receiver pressure of receiver 26 and the line 226 leading to the injection port 55 of the compressor 11 exceeds the preset adjustment of the hold back valve Z. In this embodiment, the accumulator coil 51 remains and thus there is some subcooling of the refrigerant within the accumulator coil, but the subcooler itself is eliminated. In fact, it is obvious that liquid cooling is now accomplished by the flashing method within the receiver, and this occurs in the liquid drain manifold lines as well as the receiver shell itself. Vapor is generated which is a predetermined pressure value above the injection port pressure, and thus all of the basic advantages accruing from the injection type subcooling are maintained with the single exception occurring because of the preset differential pressure of hold back valve Z. Obviously, this preset differential should be maintained as low as practical, yet set to guarantee adequate liquid feeding to the system evaporators from the liquid feed manifold 32. A slight degree of actual subcooling is still accomplished downstream of the receiver by the accumulator 15. However, it should be noted that accumulator 15 is not absolutely necessary for an operating system, and the receiver could communicate directly to the liquid feed manifold by connection of line 76 to the liquid feed manifold 32 at point 72, if no subcooling loop in the accumulator 15 is incorporated. In the case where the compressor 11 constitutes a helical screw rotary compressor and where the injection port 55 is carried by a gas injection slide valve, as in the referred to application above, the receiver pressure relative to highest evaporating pressure may be easily controlling by positioning of the gas injection slide valve itself; i.e., if the receiver pressure drops too low relative to the highest evaporating pressure, the gas injection slide valve is simply moved automatically closer to the discharge side of the helical screw compressor, that is, closer to the discharge port 46, thus causing the receiver pressure of receiver 26 to automatically rise until the balance is achieved.

Thus, in this illustrated embodiment of the invention, while there is a necessity for the seal pots as at 36, 37, 228, 40, 230 and 232 for coils 12, 14, 16, 18, 20 and 22, respectively, and while these seal pots are required to have a high side float, this arrangement eliminates the necessity for the pumps as at 38, 39 and 42 of the embodiment of FIG. 1 and their attendant bypass lines as at 92, 93 and 168, respectively. Insofar as operation is concerned, the operation of the embodiment of the invention of FIG. 3 is the same as that shown with respect to the embodiment of FIG. 1 in FIGS. 1a–1j inclusive. Further, as in this embodiment, there are obviously other modes of operation than those illustrated, depending upon system needs and the availability of thermal energy or the need for dissipation of the same.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a refrigeration system for conditioning a building space or the like and comprising:
   a first, inside heat exchange coil within said building space, and
   a second, outside heat exchange coil exterior of said space,
   said coils trading functions as evaporator and condenser to absorb heat and discharge heat respectively,
   a compressor,
   conduit means carrying refrigerant and defining a closed refrigeration loop circuit including said coils and said compressor,
   a subcooler within said circuit and including a subcooling heat exchange coil for subcooling condensed refrigerant from the coil functioning as a condenser,
   a third, heat exchange coil functioning to supply heat to the circuit or to remove heat therefrom for storage,
   a fourth, heat exchange coil functioning as a system high temperature condenser for supplying a high temperature heating load,
   the improvement wherein:
   said compressor and said subcooler comprise a single housing module including, at least, separate compressor and subcooler sections, said compressor section comprising at least one intermediate pressure injection port and one intermediate pressure ejection port, and said subcooler section comprising liquid refrigerant subcooler coil inlet and exit ports, a subcooler bleed line supply port, and a subcooler vapor return port, a subcooler heat exchange coil within said subcooler section and connected at respective ends thereof to the subcooler coil inlet and exit ports, a liquid refrigerant bleed line connecting said liquid refrigerant subcooler bleed line supply port to said conduit means downstream of said subcooler outlet port, said conduit means further including means for connecting the subcooler vapor return port to said at least one intermediate pressure injection port of said compressor section, said conduit means including a discharge manifold, a liquid drain manifold, a liquid feed manifold, and a suction manifold, said conduit means including means for connecting the subcooler coil inlet port to said liquid drain manifold and said subcooler coil outlet port to said liquid feed manifold, said conduit means comprising means for connecting said first, said second, said third and said fourth heat exchange coils across said discharge and liquid drain manifolds for permitting said coils to function as condensers within said system, said conduit means further comprising means for connecting said first coil, said second coil and said third coil across said liquid feed and suction manifolds for permitting said first, said second and said third coils to function as evaporators within said system, valve means within said conduit means for selectively controlling refrigerant flow to and from said coils, and selectively operated pump means positioned within said conduit means between said first, said second and said third coils, respectively, and said liquid drain manifold for forcing liquid refrigerant from said coils when acting as low pressure condensers to flow towards the liquid feed manifold along with condensed refrigerant from any one of said first, said second, said third and said fourth coils functioning as the high temperature condenser for said system.

2. The refrigeration system as claimed in claim 1, wherein said module further comprises a separate accumulator section, an accumulator coil positioned within said accumulator section and connected between the subcooler coil inlet and said liquid drain manifold, and said conduit means further comprising means for connecting said accumulator section between said suction manifold and said compressor suction port, such that hot liquid refrigerant within said accumulator coil effects vaporization of any liquid refrigerant accumulating within said accumulator section.

3. The refrigeration system as claimed in claim 2, further comprising a receiver connected in series with said accumulator coil and said subcooler coil, and between said liquid drain manifold and the inlet to said accumulator coil.

4. The refrigeration system as claimed in claim 1, further comprising a fifth heat exchange coil functioning to supply heat to the circuit or to store heat derived therefrom, and wherein said conduit means further includes means for connecting said fifth heat exchange coil across said liquid discharge and drain manifolds for permitting said fifth heat exchange coil to function as a condenser within said system, and means for connecting said fifth heat exchange coil across said liquid feed and suction manifolds for permitting said fifth heat exchange coil to function as an evaporator within said system, and said system further comprising valve means within said conduit means for selectively controlling refrigerant flow to and from said fifth heat exchange coil, and said conduit means further comprising means for connecting at least the outlet side of one of said third and fifth heat exchange coils to an intermediate pressure injection port of said module compressor section, and having valve means therein for controlling flow of refrigerant from the outlet of said one of said third and fifth heat exchange coils to said compressor section injection port of said coil when said coil is functioning as an intermediate pressure evaporator and supplying heat to said system.

5. The refrigeration system as claimed in claim 2, further comprising a fifth heat exchange coil functioning to supply heat to the circuit or to store heat derived therefrom, and wherein said conduit means further includes means for connecting said fifth heat exchange coil across said liquid discharge and drain manifolds for permitting said fifth heat exchange coil to function as a condenser within said system, and means for connecting said fifth heat exchange coil across said liquid feed and suction manifolds for permitting said fifth heat exchange coil to function as an evaporator within said system, and said system further comprises valve means within said conduit means for selectively controlling refrigerant flow to and from said fifth heat exchange coil, and said conduit means further comprising means for connecting at least the outlet side of one of said third and fifth heat exchange coils to an intermediate pressure injection port of said module compressor section, and having valve means therein for controlling flow of refrigerant from the outlet of said one of said third and fifth heat exchange coils to said compressor section injection port of said coil when said coil is functioning as an intermediate pressure evaporator and supplying heat to said system.

6. The refrigeration system as claimed in claim 4, further comprising a sixth heat exchange coil within said building space, and separated thermally from said first coil and functioning to supply heat to or remove heat from a separate portion of said building space, and wherein said conduit means further comprises means for connecting said sixth heat exchange coil across said discharge and liquid drain manifolds for permitting said sixth heat exchange coil to function as a condenser and means for connecting said sixth heat exchange coil across said liquid feed and suction manifolds for permitting said sixth coil to function as an evaporator and including valve means therein for selectively controlling refrigerant flow to and from said sixth heat exchange coil, and said conduit means further comprises means for connecting the inlet side of said first coil to a compressor section ejection port and including valve means therein for selectively controlling refrigerant flow from said compressor section ejection port to said first coil to cause said first heat exchange coil to function as a condenser to effect heating of said building space under conditions in which limited heating of said space is required.

7. The refrigeration system as claimed in claim 5, further comprising a sixth heat exchange coil within said building space, and separated thermally from said first coil and functioning to supply heat to or remove heat from a separate portion of said building space, and wherein said conduit means further comprises means for connecting said sixth heat exchange coil across said discharge and liquid drain manifolds for permitting said sixth heat exchange coil to function as a condenser and means for connecting said sixth heat exchange coil across said liquid feed and suction manifolds for permitting said sixth coil to function as an evaporator and including valve means therein for selectively controlling refrigerant flow to and from said sixth heat exchange coil, and said conduit means further comprises means for connecting the inlet side of said first coil to a compressor section ejection port and including valve means therein for selectively controlling refrigerant flow from said compressor section ejection port to said first coil to cause said first heat exchange coil to function as a condenser to effect heating of said building space under conditions in which limited heating of said space is required.

8. The refrigeration system as claimed in claim 1, wherein said conduit means further comprises means for connecting an ejection port of said compressor section to said second and third heat exchange coils in parallel with said conduit means connecting said discharge manifold to said coils, and including selectively operable valve means for controlling refrigerant flow from said compressor section ejection port to said second and third heat exchange coils under conditions in which said second or said third heat exchange coil performs a limited condensing function to reject heat from or to store excess heat of said refrigeration system, respectively.

9. The refrigeration system as claimed in claim 2, wherein said conduit means further comprises means for connecting an ejection port of said compressor section to said second and third heat exchange coils in parallel with said conduit means connecting said discharge manifold to said coils, and including selectively operable valve means for controlling refrigerant flow from said compressor section ejection port to said second and third heat exchange coils under conditions in which said second or said third heat exchange coil performs a limited condensing function to reject heat from or to store excessive heat of said refrigeration system, respectively.

10. The refrigeration system as claimed in claim 4, wherein said conduit means further comprises means for connecting an ejection port of said compressor section to said second and third heat exchange coils in parallel with said conduit means connecting said discharge manifold to said coils, and including selectively operable valve means for controlling refrigerant flow from said compressor section ejection port to said second and third heat exchange coils under conditions in which said second or said third heat exchange coil performs a limited condensing function to reject heat from or to store excess heat of said refrigeration system, respectively.

11. The refrigeration system as claimed in claim 5, wherein said conduit means further comprises means for connecting an ejection port of said compressor section to said second and third heat exchange coils in parallel with said conduit means connecting said discharge manifold to said coils, and including selectively operable valve means for controlling refrigerant flow from said compressor section ejection port to said second and third heat exchange coils under conditions in which said second or said third heat exchange coil performs a limited condensing function to reject heat from or to store excessive heat of said refrigeration system, respectively.

12. The refrigeration system as claimed in claim 6, wherein said conduit means further comprises means for connecting an ejection port of said compressor section to said second and third heat exchange coils in parallel with said conduit means connecting said discharge manifold to said coils, and including selectively operable valve means for controlling refrigerant flow from said compressor section ejection port to said second and third heat exchange coils under conditions in which said second or said third heat exchange coil performs a limited condensing function to reject heat or to store excess heat of said refrigeration system, respectively.

13. The refrigeration system as claimed in claim 7, wherein said conduit means further comprises means for connecting an ejection port of said compressor section to said second and third heat exchange coils in parallel with said conduit means connecting said discharge manifold to said coils, and including selectively operable valve means for controlling refrigerant flow from said compressor section ejection port to said second and third heat exchange coils under conditions in which said second or said third heat exchange coil performs a limited condensing function to reject heat from or to store excessive heat of said refrigeration system, respectively.

14. The refrigeration system as claimed in claim 6, wherein said system includes a heat storage tank carrying a first heat storage media, a hot water tank storing water, and a direct solar energy storage tank carrying a second heat storage media, and wherein said third heat exchange coil is carried by said heat storage tank and immersed in said first storage media, said fourth heat exchange coil is carried by said hot water tank and immersed in said hot water, and said fifth heat exchange coil is carried by said direct solar storage tank and immersed in said second storage media, and wherein said conduit means further comprises means for connecting said third heat exchange coil to a compressor module section ejection port so as to permit said storage coil to function either as an intermediate pressure condenser or evaporator, depending upon system mode of operation, and said conduit means for connecting said first heat exchange coil to an ejection port of the compressor module section causes said first heat exchange coil to function as a low pressure condenser in parallel with the hot water coil functioning as a system high pressure condenser with said selectively operating pump means forcing liquid refrigerant condensed within said first heat exchange coil to flow in parallel with condensed refrigerant within said fourth heat exchange coil through said liquid drain manifold and back to said liquid feed manifold.

15. In a refrigeration system for conditioning a building space or the like and comprising:
  a first, inside heat exchange coil within said building space, and
  a second, outside heat exchange coil exterior of said space,
  said coils trading functions as evaporator and condenser to absorb heat and discharge heat respectively,
  a compressor,
  conduit means carrying refrigerant and defining a closed refrigeration loop circuit including said coils and said compressor, flashcooler means within said circuit for flashcooling condensed refrigerant from the coil functioning as a condenser, a third, heat exchange coil functioning to supply heat to the circuit or to remove heat therefrom for storage, a fourth, heat exchange coil functioning as a system high temperature condenser for supplying a high temperature heating load, the improvement wherein:

said compressor and said subcooler means comprise a single housing module including, at least, separate compressor and accumulator sections, said compressor section comprising at least one intermediate pressure injection port and one intermediate pressure ejection port, and said accumulator section including accumulator inlet and exit ports, said conduit means including a discharge manifold, a liquid drain manifold, a liquid feed manifold, and a suction manifold, said conduit means including means for connecting the accumulator inlet port to said liquid drain manifold and said accumulator exit port to said liquid feed manifold, said conduit means comprising means for connecting said first, said second and said third and said fourth heat exchange coils across said discharge and liquid drain manifolds for permitting said coils to function as condensers within said system, said conduit means further comprising means for connecting said first coil, said second coil and said third coil across said liquid feed and suction manifolds for permitting said first, said second and said third coils to function as evaporators within said system, valve means within said conduit means for selectively controlling refrigerant flow to and from said coils, and a vapor return line leading from said receiver at a point above the refrigerant level within said receiver to said at least one injection port and including a hold back valve, and wherein said system further comprises seal pots between said first, second, third, and fourth heat exchange coils, and said liquid drain manifold and having high side floats therein, and wherein said vapor return line includes a hold back valve such that liquid cooling is accomplished by flashing within at least said receiver so as to guarantee minimum possible receiver pressure, and the expansion of the high pressure liquid across the lifted high side float of said seal pot tends to maintain receiver pressure the highest evaporating pressure of the coils functioning as evaporators within the system.

16. In a refrigeration system for conditioning a building space or the like and comprising:

a first, inside heat exchange coil within said building space, and a second, outside heat exchange coil exterior of said space, said coils trading functions as evaporator and condenser to absorb heat and discharge heat respectively, a compressor, conduit means carrying refrigerant and defining a closed refrigeration loop circuit including said coils and said compressor, a subcooler within said circuit and including a subcooling heat exchange coil for subcooling condensed refrigerant from the coil functioning as a condenser, a third, heat exchange coil functioning to supply heat to the circuit or to remove heat therefrom for storage, the improvement wherein:

said compressor and said subcooler comprise a single housing module including, at least, separate compressor and subcooler sections, said compressor section comprising at least one intermediate pressure injection port and said subcooler section comprising liquid refrigerant subcooler coil inlet and exit ports, a subcooler bleed line supply port, and a subcooler vapor return port, a subcooler heat exchange coil within said subcooler section and connected at respective ends thereof to the subcooler coil inlet and exit ports, a liquid refrigerant bleed line connecting said liquid refrigerant subcooler bleed line support port to said conduit means downstream of said subcooler outlet port, said conduit means further including means for connecting the subcooler vapor return port to said at least one intermediate pressure injection port of said compressor section, said conduit means including a discharge manifold, a liquid drain manifold, a liquid feed manifold, and a suction manifold, said conduit means including means for connecting the subcooler coil inlet port to said liquid drain manifold and said subcooler coil outlet port to said liquid feed manifold, said conduit means comprising means for connecting said first, said second, and said third heat exchange coils across said discharge and liquid drain manifolds for permitting said coils to function as condensers within said system, said conduit means further comprising means for connecting said first coil, said second coil and said third coil across said liquid feed and suction manifolds for permitting said first, said second and said third coils to function as evaporators within said system, valve means within said conduit means for selectively controlling refrigerant flow to and from said coils, and selectively operated pump means positioned within said conduit means between said first, said second and said third coils, respectively, and said liquid drain manifold for forcing liquid refrigerant from said coils when acting as low pressure condensers to flow towards the liquid feed manifold along with condensed refrigerant from any one of said first, said second, and said third coils functioning as the high temperature condenser for said third coils functioning as the high temperature condenser for said system.

17. The refrigeration system as claimed in claim 16, wherein said module further comprises a separate accumulator section, an accumulator coil positioned within said accumulator section and connected between the subcooler coil inlet and said liquid drain manifold, and said conduit means further comprising means for connecting said accumulator section between said suction manifold and said compressor suction port, such that hot liquid refrigerant within said accumulator coil effects vaporization of any liquid refrigerant accumulating within said accumulator section.

18. The refrigeration system as claimed in claim 17, further comprising a receiver connected in series with said accumulator coil and said subcooler coil, and between said liquid drain manifold and the inlet to said accumulator coil.

19. In a refrigeration system for conditioning a building space or the like and comprising:

a first, inside heat exchange coil within said building space, and a second outside heat exchange coil exterior of said space, said coils trading functions as evaporator and condenser to absorb heat and discharge heat respectively, a compressor, conduit means carrying refrigerant and defining a closed refrigeration loop circuit including said coils and said compressor, flash cooler means within said circuit for flash cooling condensed refrigerant from the coil functioning as a condenser, a third, heat exchange coil functioning to supply heat to the circuit or to remove heat therefrom for storage, the improvement wherein:

said compressor and said subcooler means comprise a single housing module including, at least, separate compressor and accumulator sections, said compressor section comprising at least one intermediate pressure injection port, and said accumulator inlet and exit ports, said conduit means including a discharge manifold, a liquid drain manifold, a liquid feed manifold, and a suction manifold, said conduit means including means for connecting the accumulator inlet port to said liquid drain manifold and said accumulator exit port to said liquid feed manifold, said conduit means comprising means for connecting said first, said second and said third heat exchange coils across said discharge and liquid drain manifolds for permitting said coils to function as condensers within said system, said conduit means further comprising means for connecting said first coil, said second coil and said third coil across said liquid feed and suction manifolds for permitting said first, said second and said third coils to function as evaporators within said system, valve means within said conduit means for selectively controlling refrigerant flow to and from said coils, and a vapor return line leading from said receiver at a point above the refrigerant level within said receiver to said at least one injection port and including a hold back valve, and wherein said system further comprises seal pots between said first, second and third heat exchange coils and said liquid drain manifold and having high side floats therein, and wherein said vapor return line includes a hold back valve such that liquid cooling is accomplished by flashing within at least said receiver so as to guarantee minimum possible receiver pressure, and the expansion of the high pressure liquid across the lifted high side float of said seal pot tends to maintain receiver pressure above the highest evaporating pressure of the coils functioning as evaporators within the system.

* * * * *